(12) United States Patent
Cioc et al.

(10) Patent No.: US 11,078,969 B2
(45) Date of Patent: Aug. 3, 2021

(54) SELECTABLE ONE-WAY CLUTCH WITH ELECTROMAGNETIC ACTUATOR AND DIRECT-ACTING STRUT ASSEMBLY HAVING AN ACTIVE STRUT BIASING ARRANGEMENT

(71) Applicant: Magna Powertrain, Inc., Concord (CA)

(72) Inventors: Adrian Cioc, Richmond Hills (CA); Stephen Yang, Toronto (CA)

(73) Assignee: MAGNA POWERTRAIN INC., Concord (CA)

( * ) Notice: Subject to any disclaimer, the term of this patent is extended or adjusted under 35 U.S.C. 154(b) by 163 days.

(21) Appl. No.: 16/249,088

(22) Filed: Jan. 16, 2019

(65) Prior Publication Data

US 2019/0226534 A1    Jul. 25, 2019

Related U.S. Application Data

(60) Provisional application No. 62/620,544, filed on Jan. 23, 2018.

(51) Int. Cl.
| | | |
|---|---|---|
| *F16D 27/118* | (2006.01) | |
| *F16D 27/102* | (2006.01) | |
| *F16D 41/12* | (2006.01) | |
| *F16D 41/14* | (2006.01) | |
| *F16D 41/08* | (2006.01) | |
| *F16D 41/06* | (2006.01) | |

(52) U.S. Cl.
CPC .......... *F16D 27/118* (2013.01); *F16D 27/102* (2013.01); *F16D 41/12* (2013.01); *F16D 41/084* (2013.01); *F16D 2041/0603* (2013.01)

(58) Field of Classification Search
CPC ...... F16D 27/118; F16D 27/102; F16D 41/12; F16D 41/14; F16D 47/04; F16D 27/14
See application file for complete search history.

(56) References Cited

U.S. PATENT DOCUMENTS

| | | |
|---|---|---|
| 6,290,044 B1 | 9/2001 | Burgman et al. |
| 8,079,453 B2 | 12/2011 | Kimes |

(Continued)

FOREIGN PATENT DOCUMENTS

| | | |
|---|---|---|
| DE | 102017100206 A1 | 7/2017 |
| DE | 102017214933 A1 | 3/2018 |
| DE | 102018106500 A1 | 9/2018 |

*Primary Examiner* — Tinh Dang
(74) *Attorney, Agent, or Firm* — Dickinson Wright PLLC

(57) ABSTRACT

A controllable one-way clutch assembly having an actuator module with a direct action configuration provided between a linearly-moveable actuation component of a power-operated actuator and a pivotably moveable locking element. In particular, the actuator module is equipped with a solenoid having an energizeable coil assembly, a linearly-moveable plunger having a tip portion, a strut moveable in response to energization of the coil assembly from a released position to a locked position due to engagement with the tip portion of the plunger, and a strut biasing arrangement biasing the strut toward its released position. In addition, various strut/actuator interface arrangements are provided between the tip of the plunger of the solenoid actuator and the strut to control movement of the strut between its released and locked positions.

18 Claims, 17 Drawing Sheets

(56) References Cited

U.S. PATENT DOCUMENTS

| | | |
|---|---|---|
| 8,196,724 B2 | 6/2012 | Samie et al. |
| 8,276,725 B2 | 10/2012 | Swales et al. |
| 8,418,825 B2 | 4/2013 | Bird |
| 8,491,439 B2 | 7/2013 | Kimes |
| 9,541,141 B2 * | 1/2017 | Kimes ............... F16D 41/02 |
| 9,562,574 B2 * | 2/2017 | Kimes ............... F16D 27/14 |
| 9,732,809 B2 * | 8/2017 | Niemiec ............. F16D 41/14 |
| 2016/0201738 A1 * | 7/2016 | Kimes ............... F16D 27/00 |
| | | 192/84.8 |

* cited by examiner

SELECTABLE ONE-WAY CLUTCH WITH ELECTROMAGNETIC ACTUATOR AND DIRECT-ACTING STRUT ASSEMBLY HAVING AN ACTIVE STRUT BIASING ARRANGEMENT

CROSS-REFERENCE TO RELATED APPLICATIONS

This application claims the benefit of and priority to U.S. Provisional Application No. 62/620,544, filed Jan. 23, 2018 the entire disclosure of which is incorporated herein by reference.

FIELD OF THE DISCLOSURE

The present disclosure is generally related to overrunning coupling devices such as one-way clutches or brakes. More specifically, the present disclosure is directed to selectable one-way coupling (SOWC) devices and/or electrically-controlled one way coupling (EOWC) devices equipped with an electromagnetic actuator and direct-acting strut actuation configurations.

BACKGROUND OF THE DISCLOSURE

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a rotary input component and a rotary output component for supplying motive power (i.e., drive torque) from a powertrain to a driveline in a motor vehicle. One type of brake or clutch widely used in automatic transmission is an overrunning coupling device, commonly referred to as a one-way clutch (OWC). The one-way clutch operates in a freewheeling mode when one of its races (in radial coupling configuration) or one of its drive plates (in axial coupling configuration) rotates in a first (i.e., freewheel) direction relative to the other race or drive plate. In contrast, the one-way clutch operates in a locked mode when one of its races or drive plates attempts to rotate in a second (i.e., lockup) direction relative to the other race or drive plate. Typically, a locking member, such as a strut, associated with the one-way clutch is moveable between a non-deployed position to establish the freewheeling mode and a deployed position to establish the locked mode. The strut is commonly biased by a strut spring toward one of its two distinct positions. Such conventional one-way clutches provide no independent control over their modes of operation, that is to say whether they lockup or freewheel in both directions and are commonly referred to as "passive" one-way clutches. Thus, basic one-way clutches provide the locked mode in one rotary direction and the freewheeling mode in the opposite direction based on the direction that the drive torque is being applied to the input race or drive plate.

There are however, requirements in modern automatic transmissions where a "controllable" overrunning coupling device, commonly referred to as either a selectable one-way clutch (SOWC) or an electrically-controlled one-way clutch (EOWC), can be controlled to provide additional functional modes of operation. Specifically, a controllable one-way clutch may further be capable of providing a freewheeling mode in both rotary directions until a command signal (i.e., from the transmission controller) causes a power-operated actuator to shift the coupling device into its locked mode by moving the strut into its deployed position. Thus, a controllable one-way clutch may be capable of providing a drive connection between an input member and an output member in one or both rotational directions and it may also be operable to freewheel in one or both directions. It is also known in modern automatic transmissions to integrate a passive one-way clutch and a controllable one-way clutch into a combined coupling device, commonly referred to as a bi-directional clutch.

In some instances, the controllable one-way clutches installed in automatic transmissions utilize a hydraulic actuator to selectively actuate the overrunning coupling and shift between the available operating modes. Examples of conventional controllable one-way clutches that are hydraulically-actuated are disclosed in U.S. Pat. Nos. 6,290,044, 8,079,453 and 8,491,439. It is also known to use an electromechanical actuator with the electrically-controlled one-way clutch, one example of which is disclosed in U.S. Pat. No. 8,196,724. As a further alternative, much development has recently been directed to electromagnetic actuators for use with electrically-controlled one-way clutches, examples of which are disclosed in U.S. Pat. Nos. 8,276,725 and 8,418,825. In many electromagnetic actuators, a rocker-type strut is pivoted from its non-deployed position to its deployed position in response to energization of a coil assembly. In some such electrically-controlled one-way clutches, a "direct" strut actuation configuration is used such that the strut is part of the magnetic circuit and its pivotal movement is caused by an attraction force applied directly to the strut via energization of the coil assembly. Therefore, precise control of the air gap established between the core/pole piece of the coil assembly and the magnetic strut is required to provide robust and reliable lockup functionality. As an alternative, some electrically-controlled one-way clutches are equipped with an electromagnetic actuator having an "indirect" strut actuation configuration in which an intermediate component, such as an armature or a linkage, is arranged to cause pivotal movement of the strut in response to energization of the coil assembly.

Each strut is mounted in a strut pocket formed in the clutch housing for pivotal movement into its deployed position in response to energization of the coil assembly. As noted, a strut spring is commonly used to bias the strut to its non-deployed position upon de-energization of the coil assembly. In many strut biasing arrangements, a coiled portion of a torsion spring is concentrically installed on a pivot post extending outwardly from the strut. A first tang portion of the torsion spring is in contact with the strut while a second tang portion of the torsion spring is in contact with the clutch housing which pivotally supports the strut. When the strut is actuated (i.e., "passively" via centrifugal action or "actively" via a power-operated actuator) for movement from its non-deployed position into its deployed position, the coiled portion of the torsion spring winds around the pivot post and provides a return torque that opposes the actuating torque exerted on the strut. When strut actuation is no longer required, the torsion spring unwinds and returns the strut back to its non-deployed position.

In controllable one-way clutches configured with a direct strut actuation arrangement, the coil assembly is energized to drive the linearly-moveable actuation member, commonly referred to as a "plunger", from a retracted position into an extended position which, in turn, causes the strut to be driven from its non-deployed position into its deployed position. Accordingly, the actuation force generated upon energization of the coil assembly must be capable of overcoming the biasing force exerted directly on the strut via the strut spring in addition to the biasing applied to the plunger via an internal plunger spring which biases the plunger toward its retracted position. The magnitude of the strut spring biasing force, in combination with the magnitude of the plunger spring biasing force, impacts the overall size and mass of the electromagnetic actuator. In addition, the relative position between the tip of the plunger and the underside surface of the strut must be precisely controlled to most efficiently and accurately control actuation of the strut.

While traditional strut-type one-way clutches used in motor vehicle applications meet all requirements, a need exists to continue development of improved actuators and strut actuation arrangements, particularly, direct strut actuation arrangements, for use in controllable one-way clutches that address and overcome issues, such as those noted above, and advance the functionality and packaging thereof.

SUMMARY OF THE DISCLOSURE

This section provides a general summary of the disclosure and is not intended to be considered a comprehensive listing of all of its aspects, features and objectives.

It is an aspect of the present disclosure to provide a controllable one-way clutch assembly adapted for use in a power transmission device.

It is a related aspect to provide an actuator module for use with controllable one-way clutch assembly having a direct actuation configuration provided between a moveable actuation component of a power-operated actuator and a pivotably moveable locking element.

It is another related aspect to provide a one-way clutch assembly comprised of a clutch module and an actuator module. The actuator module is mounted to a first clutch member of the clutch module and includes a solenoid-type actuator having an energizeable coil assembly and a linearly-moveable actuation component, a strut pivotably moveable between a released (i.e., non-deployed) position and a locked (i.e., deployed) position relative to ratchet teeth formed on a second clutch member associated with clutch module in response to translation of the actuation component between a first (i.e., retracted) position and a second (i.e., extended) position, and a strut biasing arrangement normally biasing the strut toward its released position.

It is another aspect of the present disclosure to provide the one-way clutch assembly with an improved strut/actuator engagement interface configured to minimize sliding movement between a tip of the linearly-moveable actuation component associated with the solenoid-type actuator and an engagement surface associated with the pivotable strut.

It is yet another aspect of the present disclosure to provide the one-way clutch assembly with a predetermined separation or "gap" between the tip of the linearly-moveable actuation component associated with the solenoid-type actuator and the engagement surface associated with the pivotable strut when the strut is located by the strut biasing arrangement in its released position to provide an alternative strut/actuator engagement interface configuration.

It is yet another aspect of the present disclosure to provide the one-way clutch assembly with another alternative strut/actuator engagement interface configuration which includes an engagement cam formed on the engagement surface of the strut and which is engageable with the actuation component of the solenoid-type actuator to vary the behavior of the pivotal movement of the strut between its released and engaged positions.

It is yet another aspect of the present disclosure to provide the one-way clutch assembly with an actuator module wherein the solenoid-type actuator includes an internal return spring acting to bias the actuation component toward its first position, and wherein the actuator component is a linearly-movable plunger arranged to act on the engagement surface of the strut.

It is a related aspect of the present disclosure to provide the one-way clutch assembly having a strut/actuator engagement interface wherein the tip of the plunger is displaced a first distance from the engagement surface on the strut when the plunger is located in its first position and the strut is located in its released position.

It is yet another related aspect of the present disclosure to provide the one-way clutch assembly having a strut/actuator engagement interface wherein initial movement of the plunger from its first position toward an intermediate position causes the tip of the plunger to engage the engagement surface of the strut and drive the strut from its released position into its locked position in opposition to the biasing exerted on the strut by the strut biasing member.

It is yet another related aspect of the present disclosure to provide the one-way clutch assembly having a strut/actuator engagement interface wherein continued movement of the plunger from its intermediate position toward its second position causes the tip of the plunger to disengage the engagement surface of the strut in its locked position such that the tip of the plunger is displaced a second distance from the engagement surface of the strut, and wherein the second distance is greater than the first distance.

It is yet another aspect of the present disclosure to provide a one-way clutch assembly having a strut/actuator engagement interface wherein location of the plunger in its first position defines a first plunger tip position with an angle of less than ninety degrees relative to the engagement surface of the strut, wherein location of the plunger in its intermediate position defines a second plunger tip position whereat the tip of the plunger engages the engagement surface of the strut at an angle of ninety degrees relative to the engagement surface of the strut, and wherein location of the plunger in its second position defines a third plunger tip position with an angle greater than ninety degrees relative to the engagement surface of the strut.

It is yet another aspect of the present disclosure to provide the one-way clutch assembly including a camming feature formed on the engagement surface of the strut and which interacts with the tip of the plunger to control movement of the strut, and wherein the camming feature is one of a concave or convex shape.

It is yet another aspect of the present disclosure to provide the one-way clutch assembly with an electromagnetic actuator module that is a solenoid, wherein the solenoid has an internal return spring, and wherein the moveable actuator component is a linearly-moveable plunger arranged to act on an engagement surface of the strut.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 6 illustrates an alternative embodiment of an actuator module for a one-way clutch with the strut located in its locked/deployed position while

DESCRIPTION OF THE ENABLING EMBODIMENTS

Example embodiments will now be described more fully with reference to the accompanying drawings. In general, each embodiment is directed to a overrunning coupling device having at least a controllable one-way locking device (i.e., brake and/or clutch) including a moveable locking component (i.e., sprag, strut, etc.) that is controlled via an electromagnetic actuator. Thus, the controllable one-way locking device transmits torque mechanically but is actuated via an electrical actuation system. However, these example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
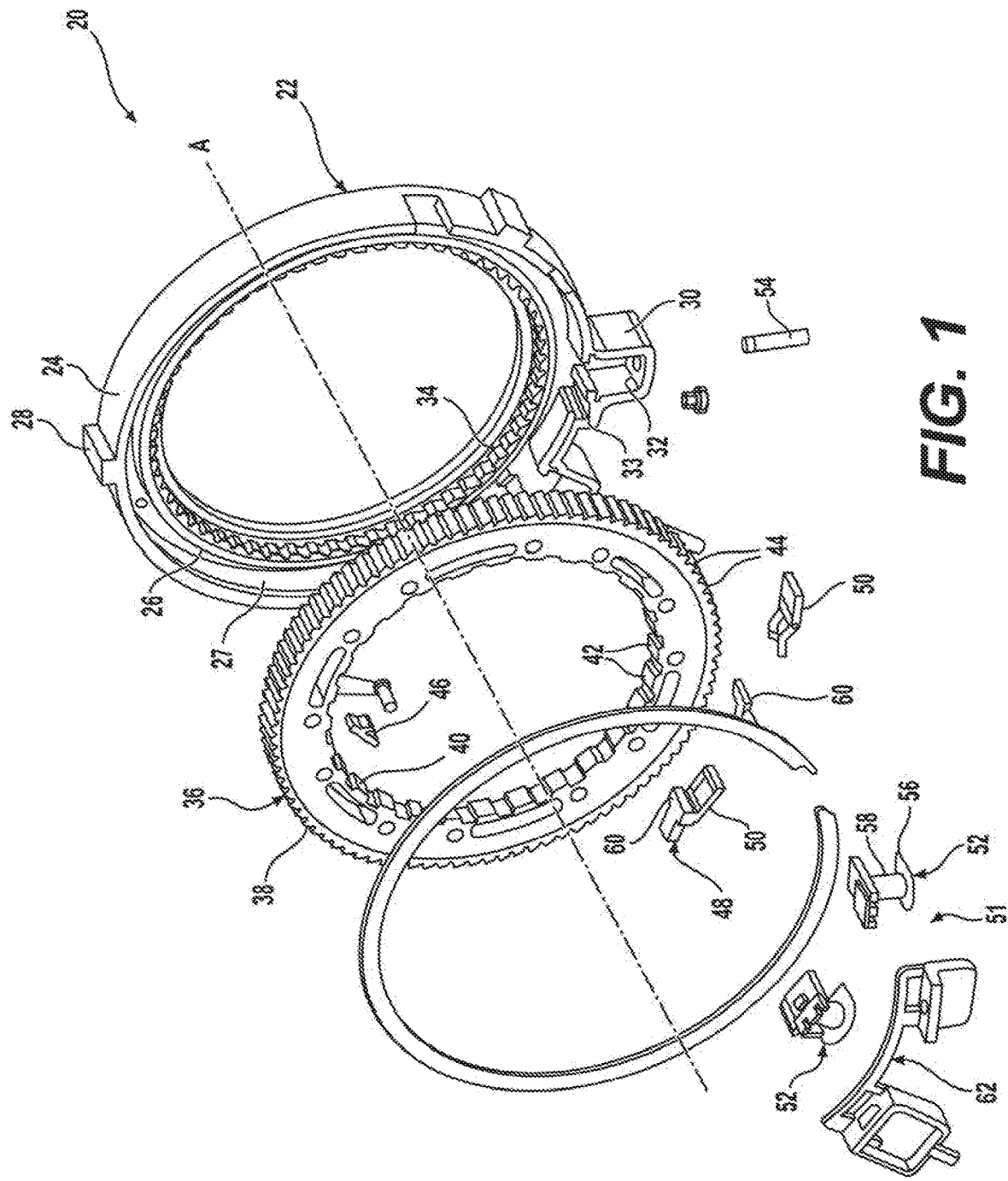
FIG. 1 is an exploded isometric view of a bi-directional clutch assembly configured to include a passive one-way clutch and a controllable one-way clutch.

Referring to FIG. 1, an example embodiment of a bi-directional clutch assembly 20 is generally shown in an exploded view. Bi-directional clutch assembly 20 is of a type adapted, for example, for use in an automatic transmission which is controlled to actuate a friction clutch assembly. Clutch assembly 20 includes a "controllable" overrunning coupling device, commonly referred to as an electrically-controlled one-way clutch (EOWC). For purposes of this application, the term "clutch assembly" should be interpreted to include couplings, clutches and brakes wherein one component is drivingly connected to a torque delivery component of the transmission while the other component is drivingly connected to another torque delivery component or is non-rotatably fixed to a transmission housing or other stationary component.

As will be detailed, bi-directional clutch assembly 20 is shown in this non-limiting embodiment to generally include a clutch module having a first clutch member (i.e., outer race) and a second clutch member (i.e., inner race), a passive one-way clutch having a plurality of passive struts, and a controllable one-way clutch having at least one active strut assembly and power-operated actuator, cumulatively defining an actuator module. As noted, the clutch 20 module is comprised of an outer race 22 and an inner race 36. Outer race 22 includes an outer ring segment 24 and an inner ring segment 26 that are spaced radially from one another and interconnected via a radial web segment 27. Outer ring segment 24 includes a plurality of outer lugs 28 that extend radially outwardly for mating with a first component. The first component can be a stationary component (such as a housing of a transmission) or a rotary component (such as a shaft). The outer ring segment 24 further includes a pair of protrusions 30 that extend radially outwardly. Each of the protrusions 30 defines a radially extending actuator pocket 32 and a strut pocket 33. It should be appreciated that more or fewer protrusions 30 could be utilized and that they may be formed integrally with outer race 22 rigidly secured thereto. The inner ring segment 26 includes a plurality of inner ramp surfaces, hereinafter referred to as inner ratchet teeth 34, which extend radially inwardly and are evenly distributed about the axis A. The inner race 36 has an outer rim 38 and an inner rim 40 that are spaced radially from one another. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 includes a plurality of outer ramp surfaces, hereinafter referred to as outer ratchet teeth 44 that extend radially outwardly and are evenly distributed about the axis A.

The passive one-way clutch includes a plurality of passive locking elements, hereinafter passive struts 46, that are supported in strut apertures formed in the inner race 36 for pivotal movement between a locking (deployed) position and an unlocking (non-deployed) position. In the locking position, at least one of the passive struts 46 engages the inner ratchet teeth 34 of the outer race 22 for coupling the outer and inner races 22, 36 to one another during counter-clockwise rotation of the inner race 36 relative to the outer race 22. Therefore, engagement by one or more of the passive struts 46 prevents relative rotation of the outer and inner races 22, 36 in the counter-clockwise direction. However, the passive struts 46 still allow relative rotation, i.e., overrun, in the clockwise direction when located in the locking position since they are permitted to ratchet over the ramped profile of the inner ratchet teeth 34. In the unlocking position, the passive struts 46 are radially spaced from the inner ratchet teeth 34 of the outer race 22, therefore also allowing counter-clockwise rotation of the inner race 36 relative to the outer race 22. While not specifically shown, strut springs are provided to normally bias the passive struts 46 toward their unlocking position.

Figure 1A:
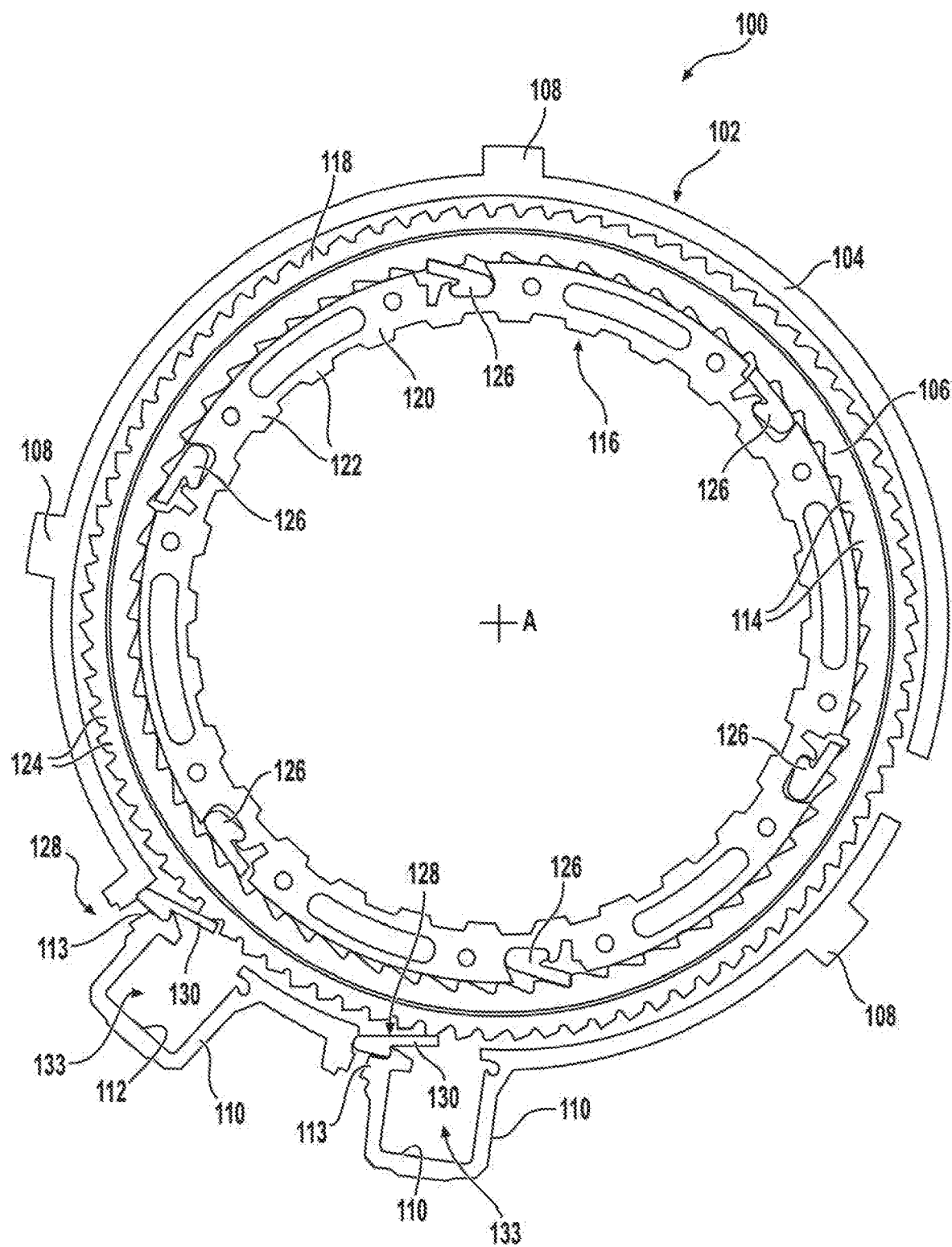
FIG. 1A is a sectional view of a clutch assembly similar to that shown in FIG. 1.

In association with the controllable one-way clutch, the actuator module includes a pair of active strut assemblies 48 and a pair of electromagnetic actuators 51. Each active strut assembly 48 is disposed within a corresponding one of the strut pockets 33 formed in the outer ring segment 24. Each active strut assemblies 48 includes an active locking element, hereinafter an active strut 50, that is selectively pivotal between a locked (deployed) and an unlocked (non-deployed) position. In the locked position, the active strut 50 lockingly engages the outer ratchet teeth 44 of the inner race 36, thereby locking the outer and inner races to one another during clockwise movement of the inner race 36 relative to the outer race 22. However, the active strut 50 still allows relative displacement, i.e., overrun, in the counter-clockwise direction. In the unlocked position, the active strut 50 is radially spaced from the outer ratchet teeth 44, thereby allowing the outer and inner races 22, 36 to rotate relative to one another. Furthermore, each of the active strut assemblies 48, in this non-limiting example, includes an armature 60 that is disposed adjacent to the active strut 50 for controlling the pivotal movement of the active strut 50 in response to actuation of electromagnetic actuator 51. Thus, the active strut assemblies 48 define an "indirect" strut actuation arrangement. However, active strut assemblies 48 can alternatively be configured in a "direct" strut arrangement without the armature 60 such that electromagnetic actuator 51 directly controls movement of active struts 50, such as shown in FIG. 1A.

The actuator module associated with the controllable one-way clutch is shown to include a pair of the electromagnetic actuators 51, each including a coil assembly 52 mounted in the actuator pocket 32 and being radially spaced from the active strut 50 and the armature 60. The coil assembly 52 includes a core 54 of a magnetically permeable material, a bobbin 56 disposed about the core 54, and a wire coil 58 wrapped about the bobbin 56. Furthermore, the armature 60 is disposed between the active strut 50 and the coil 58 for pivoting toward the core 54 in response to energization of the coil 58 and thus providing the pivotal movement of the active strut 50. Armature 60 can be made of a magnetic material so as to be magnetically attracted to core 54 upon energization of coil 58 or made of a non-magnetic material so as to be mechanically-coupled to a moveable component (solenoid) in alternative actuators 51.

In a preferred but non-limiting arrangement, when voltage and/or current are applied to the coils 58, the coils 58 become an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion of the armature 60 forces the active strut 50 to mechanically deploy due to the mechanical linkage between the active strut 50 and the armature 60. Upon deployment, the active strut 50 moves from its unlocked position to its locked position whereat it locates itself against one of the outer ratchet teeth 44 of the inner race 36, effectively locking the inner race 36 from rotating in that direction. Disengagement occurs as voltage and/or current is removed from the coil assembly 52, wherein the armature 60 is demagnetized and free from the coil assembly 52. A strut biasing member, such as a strut return spring (not shown), is positioned between the active strut 50 and the outer race 22 and causes the active strut 50 to move back to its unlocked position during disengagement.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radially stacked clutch assembly 20 offers packaging advantages over its axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of the electromagnetic actuators 51 for electrically connecting the coils 58 to one another for coordinated energization of the coils 58. It should be appreciated that the lead frame 62 could connect any number of coils 58. A printed circuit board (PCB) is attached to the lead frame 62 for selectively controlling the energization of the coils 58. The PCB is disposed radially and axially adjacent to one of the coils 58. The lead frame 62 further includes at least one power output contact that is disposed radially and axially adjacent to each of the coils 58 for electrically connecting to the coils 58 to provide power to the coils 58. Any number of power contacts could be utilized to power any number of coils 58. The lead frame 62 also includes a wire harness that extends from the printed circuit board for connecting to a transmission control module (TCM) or a powertrain control module (PCM) for transmitting data to the circuit board and to power the circuit board. Additionally, the lead frame 62 includes a plastic encapsulation or casing that is disposed about the printed circuit board and the wires for protecting the printed circuit board and the wires for allowing the lead frame 62 to be submerged in Automatic Transmission Fluid and operate in −40 C to +140 C temperatures. It should be appreciated that the aforementioned configuration of the lead frame 62 and associated components provide a low-cost, modular solution that provides for a more simplified manufacturing process.

The applied voltage to the coils 58 is comprised of a High Side (HS) and Low Side (LS) and is supplied by the TCM or the PCM of a vehicle. The HS is typically a shared power supply with other loads, and the LS is typically a discrete channel (LSD) that controls the discrete/individual circuit.

The LSD is capable of controlling the amount of current across the coils 58. Since the LSD is typically located in the TCM/PCM, there is a requirement to have a wire harness between the electromagnetic actuators 51 and the TCM/PCM. If the wire harness suffers mechanical damage and the electromagnetic actuators 51 discrete LSD channel is "short circuited-to chassis ground", the coils may become energized. Accordingly, an Integrated High Side Fail Safe Switch (HSFSS) is provided to add another level of logic in order to control the shared HS supply. The HSFSS is comprised of the PCB 64, a HS Switch (not shown), a transistor (not shown), and passive components (not shown). They are electrically connected to the lead frame 62. It should be appreciated that the configuration of the lead frame 62 protects the integrated electronic components (including the HSFSS), and provides improved packaging and reduced wiring. Furthermore, it should be appreciated that the modular configuration of the lead frame 62 and associate components could be utilized on other clutch assembly configurations, e.g., axially engaging clutch assemblies. The HSFSS is controlled by the OWCC_HS_ENABLE, which enables the HSFSS to pass current to the coils 58.

Referring now to FIG. 1A, a slightly modified version of bi-directional clutch assembly 20 of FIG. 1 is now identified by reference numeral 100. Generally speaking, bi-directional clutch assembly 100 again includes a clutch module and at least one actuator module. However, in this embodiment, a "direct" strut actuation arrangement is provided between the power-operated actuator and the active strut. The clutch module includes an outer race 102 that extends annularly about an axis A. The outer race 102 presents an outer ring segment 104 and an inner ring segment 106 that are spaced radially from one another. The outer ring segment 104 includes a plurality of outer lugs 108 that extend radially outwardly for mating with a first component. The first component can be a stationary component (such as a housing of a transmission) or a rotary component (such as a shaft). The outer ring segment 104 further includes a pair of protrusions 110 that extend radially outwardly. Each of the protrusions 110 defines a radially extending actuator pocket 112 and a strut pocket 113. It should be appreciated that more or fewer protrusions 110 could be utilized. The inner ring segment 106 presents a plurality of ramped inner ratchet teeth 114 that extend radially inwardly and are evenly distributed about the axis A.

The clutch module of the clutch assembly 100 further includes an inner race 116 that also extends annularly about the axis A. The inner race 116 has an outer rim 118 and an inner rim 120 that are spaced radially from one another with the outer rim 118 disposed radially between the outer and inner ring segments 104, 106 of the outer race 102, and the inner rim 120 disposed radially inwardly from the inner ring segment 106 of the outer race 102. The inner rim 120 of the inner race 116 presents a plurality of inner lugs 122 that extend radially inwardly therefrom for mating with a second component (typically a rotary component). Further, the outer rim 118 of the inner race 116 presents a plurality of ramped outer ratchet teeth 124 that extend radially outwardly and are evenly distributed about the axis A.

The passive one-way clutch associated with bi-directional clutch assembly 100 includes six passive struts 126 that are pivotably supported by inner race 116. It should be appreciated that more or fewer passive struts 126 could alternatively be utilized. The passive struts 126 are moveable for engaging the inner ratchet teeth 114 on the inner ring segment 106 of the outer race 102 for preventing relative displacement of the inner and outer races 116, 102 in the counter-clockwise direction. However, the passive struts 126 allow relative displacement (i.e., overrun) between the inner and outer races 116, 102 in the clockwise direction.

In the controllable one-way clutch associated with bi-directional clutch assembly 100, each actuator module includes an active strut assembly 128 and an electromagnetic actuator 133. Each active strut assembly 128 is received in a corresponding one of the strut pockets 113 of the outer ring segment 104. Each of the active strut assemblies 128 includes an active strut 130 that is selectively pivotal between a locked (deployed) and an unlocked (non-deployed) position. In the locked position, the active struts 130 engage the outer ratchet teeth 124 on the inner race 116, to prevent relative displacement of the inner and outer races 102, 116 in the clockwise direction. However, the active struts 130 allow relative displacement, in the counter-clockwise direction. In the unlocked position, the active struts 130 are radially spaced from the outer ratchet teeth 124, allowing the inner and outer races 116, 102 to rotate relative to one another.

As noted, the actuator module of the controllable one-way clutch also includes electromagnetic actuator 133. Each electromagnetic actuator 133 is generally similar to electromagnetic actuators 51 and includes a coil assembly 52 that is radially spaced from the active strut 130. The coil assembly 52 includes a core 54 of a magnetically permeable material, a bobbin 56 disposed about the core 54, and a coil 58 wrapped about the bobbin 56. The active strut 130 is located adjacent to the coil 58 for pivoting toward the core 54 and thus providing the pivotal movement of the active strut 130 in response to energization of the coil 58.

The combination of the passive and active struts 126, 130 provide for a bi-directional configuration of the clutch assembly 100 that allows engagement in two opposite directions (clockwise and counter-clockwise). It should be appreciated that this concept is also applicable in axially oriented configurations.

Figure 2:
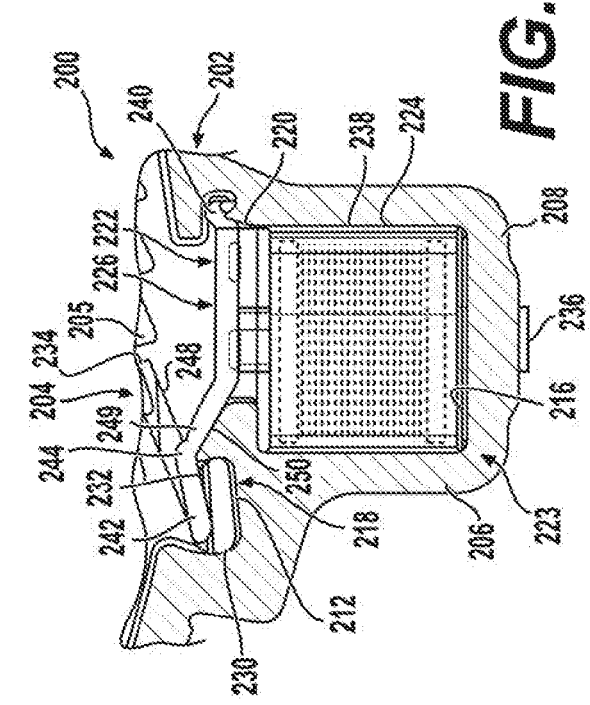
FIG. 2 is an enlarged partial view of an actuator module adapted for use with the controllable one-way clutch associated with the bi-directional clutch assembly shown in FIG. 1 and which is configured to provide a high inertia load resistance arrangement for resisting hydraulic strut deployment and illustrating a strut located in a released (non-deployed) position when the coil assembly is non-energized.
Figure 3:
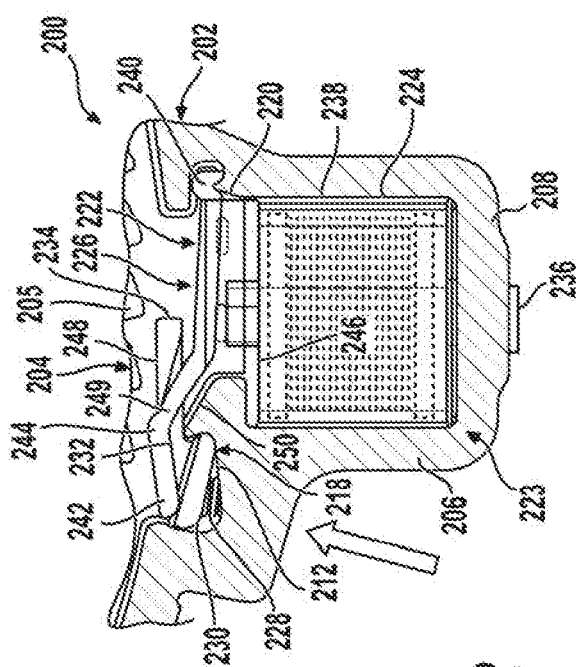
FIG. 3 is similar to FIG. 2 but now illustrates the strut located in a locked (deployed) position in response to energization of the coil assembly.
Figure 4:
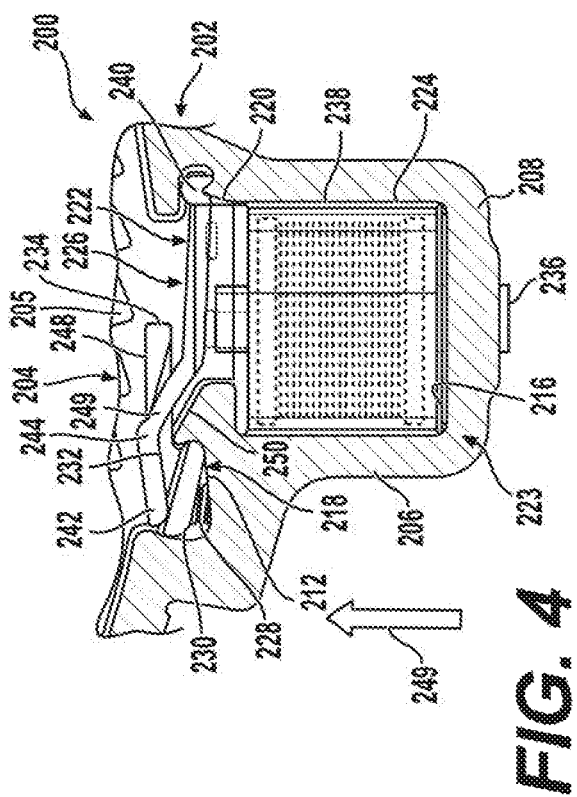
FIG. 4 is also similar to FIG. 2 but illustrates the inertia load resistance arrangement positively holding the strut in its released position upon application of a radially directed high inertial load.

Referring to FIGS. 2-4, wherein like numerals indicate corresponding parts throughout the several views, a portion of another embodiment of an electrically-controlled one-way clutch assembly 200 is generally shown. The clutch assembly 200 includes a clutch module and at least one actuator module. The clutch module includes an outer race 202 that extends annularly about a center axis (not shown). Further, the clutch module includes an inner race 204 which extends annularly about the axis A and is disposed radially inwardly from the outer race 202. The inner race 204 presents a plurality of outer ratchet teeth 205 that extend radially outwardly.

The outer race 202 includes a plurality of protrusions 206 that each extend radially outwardly to a back surface 208 and each defines a pocket. Each of the pockets is divided into a strut section 212, an armature section 214 and a core section 216 with the core section 216 disposed between the strut 218 and armature sections 214. The core section 216 extends radially outwardly past the strut 218 and armature sections 214. The back surface 208 presents a pivot rail 220 that extends radially inwardly therefrom in the armature section 214.

Each actuator module includes an active strut assembly 222 and an electromagnetic actuator 223. One of the active strut assemblies 222 is received in each of the pockets 212, 214, 216 of the outer race 204. Each of the active strut assemblies 222 includes, in this non-limiting "indirect" actuation configuration, an armature 226, a strut spring 228, and a strut 218. The strut 218 includes a base segment 230 and a pair of locking arms 232. The locking arms 232 each extend from the base segment 230 to a locking edge 234. The base segment 230 is pivotally disposed in the strut 218 segment between a locked position and an unlocked position. In the locked position, the locking edges 234 engage the outside teeth 205 of the inner race 204, and in the unlocked position, the locking edges 234 are radially spaced from the outside teeth 205. The strut spring 228 is disposed in the strut section 212 of the pocket 210 and extends between the back surface 208 and the strut 218 for biasing the strut 218 toward its unlocked position.

Each electromagnetic actuator 223 includes a coil assembly 224 having a core 236 of a magnetically permeable material that is disposed in the core section 216 of the pocket 210. Furthermore, at least one coil 238 is disposed in the core section 216 and wrapped about the core 236 for focusing the magnetic flux produced by the coil 238 on the core 236.

The armature 226 extends between a first end 240 that is seated in the armature section 214 and a second end 242 that is disposed in the strut section 212 in engagement with the base of the strut 218 between the legs of the strut 218. The first end 240 of the armature 226 is pivotally disposed about the pivot rail 220 in the armature section 214 of the pocket 210 for pivoting radially toward and away from the core 236 in response to energization of the coil 238 between an actuated position and a non-actuated position. In the actuated position, the armature 226 is drawn toward the core 236 and drives the strut 218 into the locked position against the biasing of strut spring 228. In the non-actuated position, the armature is spaced from the core 236 and allows the strut spring 228 to bias the strut 218 into its unlocked position. The armature 226 presents an upper bend 244 and a lower bend 246 between the first end 240 and the second end 242.

It is important, especially when the clutch assembly 200 is utilized on automotive components, for the struts 218 to only engage the outside teeth 205 of the inner race 204 when they are energized. Therefore, resistance to inertia loading (high g-force in certain directions other than simple gravity) is important for the operation of the clutch assembly 200. The most common method of resisting high inertia loading is to utilize a higher force strut spring 228. While this method is simple, there are disadvantages. One of the disadvantages is the increased resistance provided by the strut spring 228 during normal operation, which requires the armature and/or coil assembly 226, 224 to be increased in size and thickness to utilize larger magnetic forces. To accommodate such larger components, the pockets 210 may also need to be larger.

As an alternative solution to increasing the size of the armature/coil assembly 226, 224, each of the locking arms 232 includes a projection 248 that has a generally triangular shaped cross-section that extends axially, with the projections 248 of the two locking arms 232 extend toward one another. Each of the projections terminates at a point 249. Further, a shoulder 250 is defined by the upper bend 244 of the armature 226 for being engaged by the point 249 of the projections 248 of the legs of the strut 218 for limiting movement of the strut 218 toward the locked direction. Thus, during the application of inertial forces, the modified profile causes the strut 218 to stop rotating upward, therefore preventing unintended engagement of the outside teeth of the inner race 204.

FIG. 2 presents a non-energized state of the coil 238 such that the strut 218 is located in the unlocked position. Further, FIG. 3 presents an energized state of the coil 238 for causing the strut 218 to move into the locked position. FIG. 4 shows the situation in which a high inertial load is applied to the clutch assembly 200 in the radial inward direction (as shown by the arrow 249). In this situation, the armature 226 rotates clockwise slightly, however, the strut 218 is blocked from rotating counter-clockwise any further by the shoulder 250 of the armature 226. Therefore, the interference between the point 249 of the projection 248 and the shoulder 250 of the armature 226 increase the force required to move the strut 218 against the outside teeth of the inner race 204, but doesn't increase the amount of load required by the armature/coil assembly 226, 224 to move the strut 218. It should be appreciated that the projections 248 of the loading arms 232 and shoulder 250 of the armature 226 could be utilized on other active strut assembly configurations to resist high inertia loading.

Figure 5:
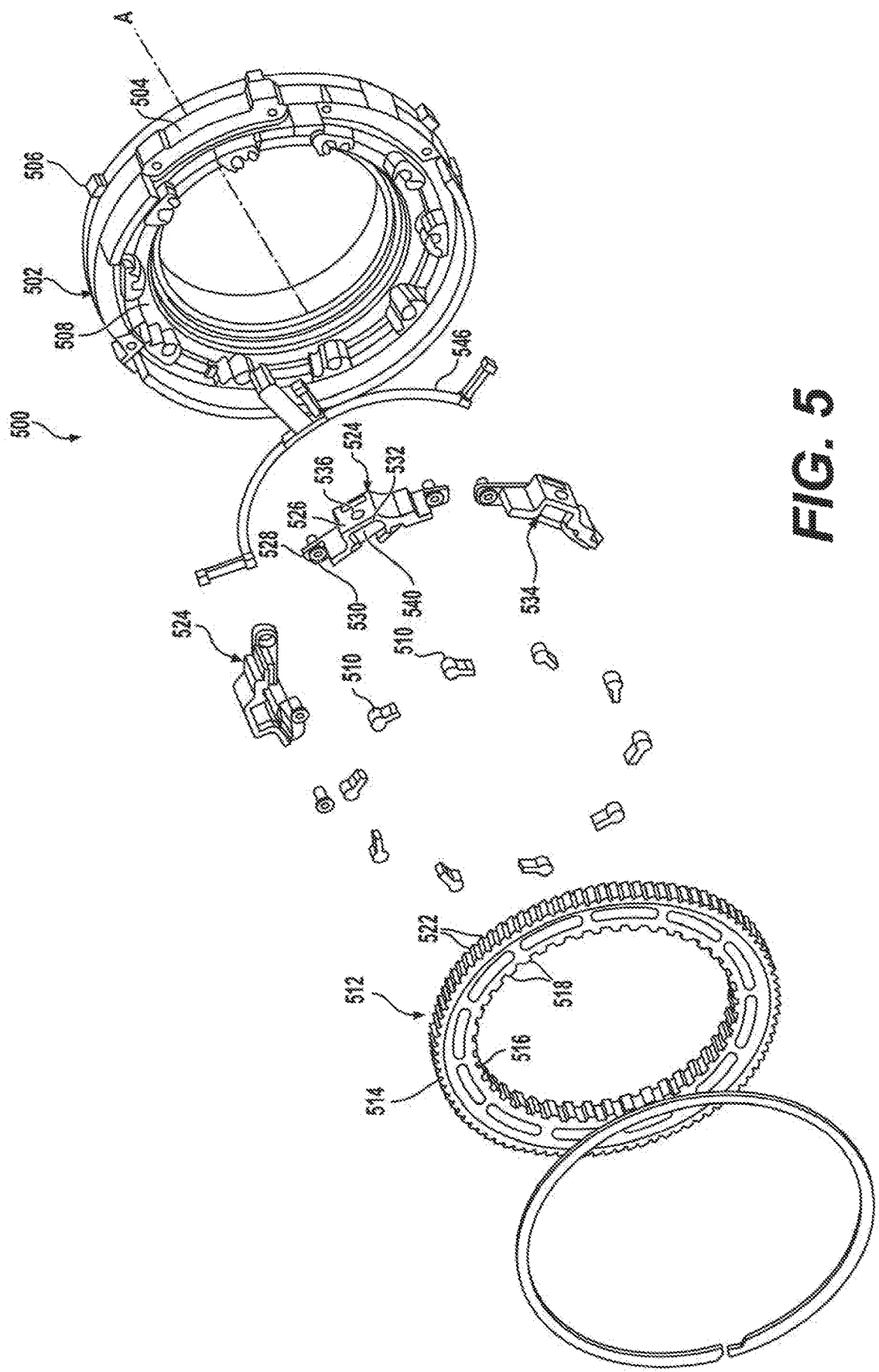
FIG. 5 is an exploded isometric view of a bi-directional clutch assembly configured to include a modular active strut arrangement for a controllable one-way clutch in accordance with another aspect of the present disclosure.

Referring to FIG. 5, another non-limiting embodiment of a controllable bi-directional clutch assembly 500 is generally shown. The clutch assembly 500 includes a clutch module having an outer race 502 and an inner race 512. The outer race 502 extends annularly about an axis A. The outer race 502 includes an outer ring 504 that presents a plurality of outer lugs 506 that extend radially outwardly for mating with a first component. The first component can be a stationary component (such as a housing of a transmission) or a rotary component (such as a shaft). The outer race 502 further has an axial face 508 that has an annular shape that extends radially inwardly from the outer ring 504. A plurality of passive struts 510 are pivotally connected to the axial face 508. A biasing spring (not shown) engages each of the passive struts 510 for biasing the passive struts 510 in a locked position toward the inner race 512.

The inner race 512 extends annularly about the axis A. The inner race 512 has an outside band 514 and an inside band 516 that are spaced radially from one another on opposing sides of the passive struts 510. The inside band 516 of the inner race 512 presents a plurality of inner lugs 518 that extend radially inwardly therefrom for mating with a second component (typically a rotary component). The inside band 516 of the inner race 512 further presents a plurality of passive teeth 520 that extend radially outwardly therefrom for being engaged by the passive struts 510 for locking the inner and outer races 512, 502 to one another in response to counter-clockwise rotation of the inner race 512 relative to the outer race 502. The outside band 514 of the inner race 512 presents a plurality of active teeth 522 that extend radially outwardly therefrom and are evenly distributed about the axis A.

The plurality of passive struts 510 are pivotable between a locking position and an unlocking position. In the locking position, the passive struts 510 engage the passive teeth 520 of the outer race 502 for connecting the outer and inner races 502, 512 to one another during counter-clockwise rotation of the inner race 512 relative to the outer race 502. Therefore, engagement by the passive struts 510 prevents relative displacement of the outer and inner races 502, 512 in the counter-clockwise direction, however, the passive struts 510 allow relative displacement, i.e., overrun, in the clockwise direction. In the unlocking position, the passive struts 510 are radially space from the passive teeth 520 of the outer race 502, therefore allowing counter-clockwise rotation of the inner race 512 relative to the outer race 502.

A plurality of actuator modules 524 are axially connected to the outer race 502. Each actuator modules 524 has a housing that is generally arc shaped and includes a base 526 and a pair of flanges 528 that extend from the base 526 on opposing sides of the base 526. Each actuator module 524 also includes an active strut assembly and an electromagnetic actuator which are configured to provide a "direct" strut actuation configuration. A fastener 530, e.g., a bolt, extends through each of the flanges 528 and is connected to the outer race 502 for securing the housings of the actuator modules 524 to the outer race 502. The actuator modules 524 are arranged in circumferential alignment with one another about the axis A.

A coil pocket 532 extends axially into the base 526. A coil assembly 534 associated with the electromagnetic actuator is received in each of the coil pockets 532. The coil assembly 534 includes a core 536 of a magnetically permeable material, a bobbin 538 disposed about the core 536, a coil 540 wrapped about the bobbin 538, and a linearly-moveable actuation component (i.e., "plunger"). It should be appreciated that the coil assemblies 534 can advantageously be easily fitted into the pocket for easy installation.

Each of the active strut assemblies includes an active strut 542 that is selectively pivotal relative to the housing of the actuator module 524 between a locked and an unlocked position. In the locked position, the active struts 542 engage the active teeth 522 of the inner race 512, therefore locking the outer and inner races 502, 512 to one another during clockwise movement of the inner race 512 relative to the outer race 502. However, the active struts 542 allow relative displacement, i.e., overrun, in the counter-clockwise direction. In the unlocked position, the active struts 542 are radially spaced from the outside teeth 520, 522, allowing the inner and outer races 512, 502 to rotate relative to one another. A strut spring (not shown) is also associated with each active strut assembly and is configured to normally bias the active strut 542 toward its unlocked position. In operation, energization of coil assembly 534 causes the plunger to move from a retracted position to an extended position for forcibly driving active strut 542 to move from its unlocked position into its locked position. Upon power being turned off, the plunger moves back to its retracted position which, in turn, permits the strut spring to forcibly drive the active strut 542 back to its unlocked position.

Accordingly, it should be appreciated that the modular configuration of the actuator modules 524 allows the active strut assemblies and electromagnetic actuator to be manufactured and assembled separately from the rest of the clutch assembly 500. Further, it should be appreciated that any number of the actuator modules 524 could be installed on any given clutch assembly 500 as needed to provide a needed amount of torque. Additionally, it should be appreciated that the actuator modules 524 as described herein could be utilized on various other clutch assembly configurations.

Figure 6:
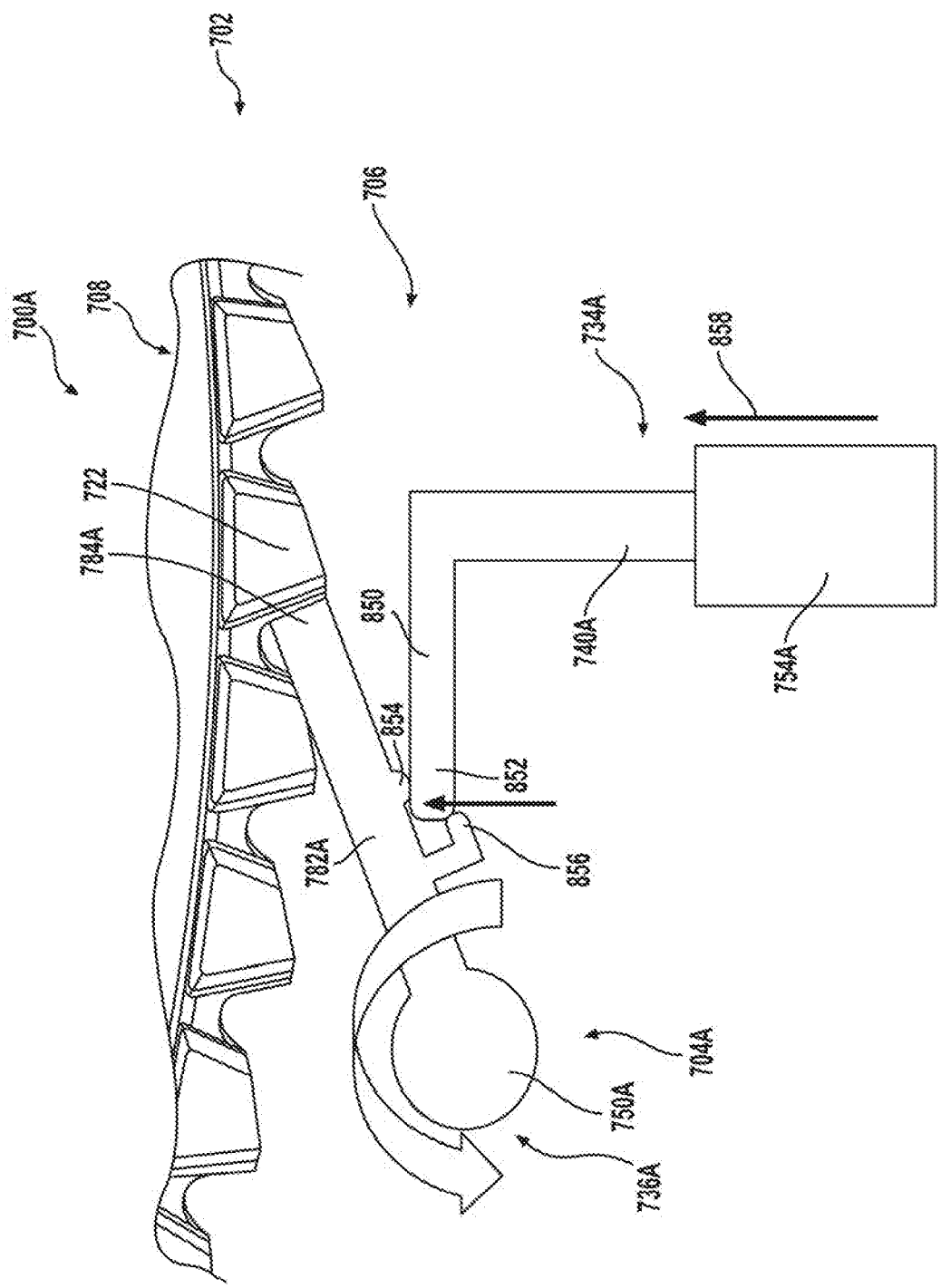
Figure 7:
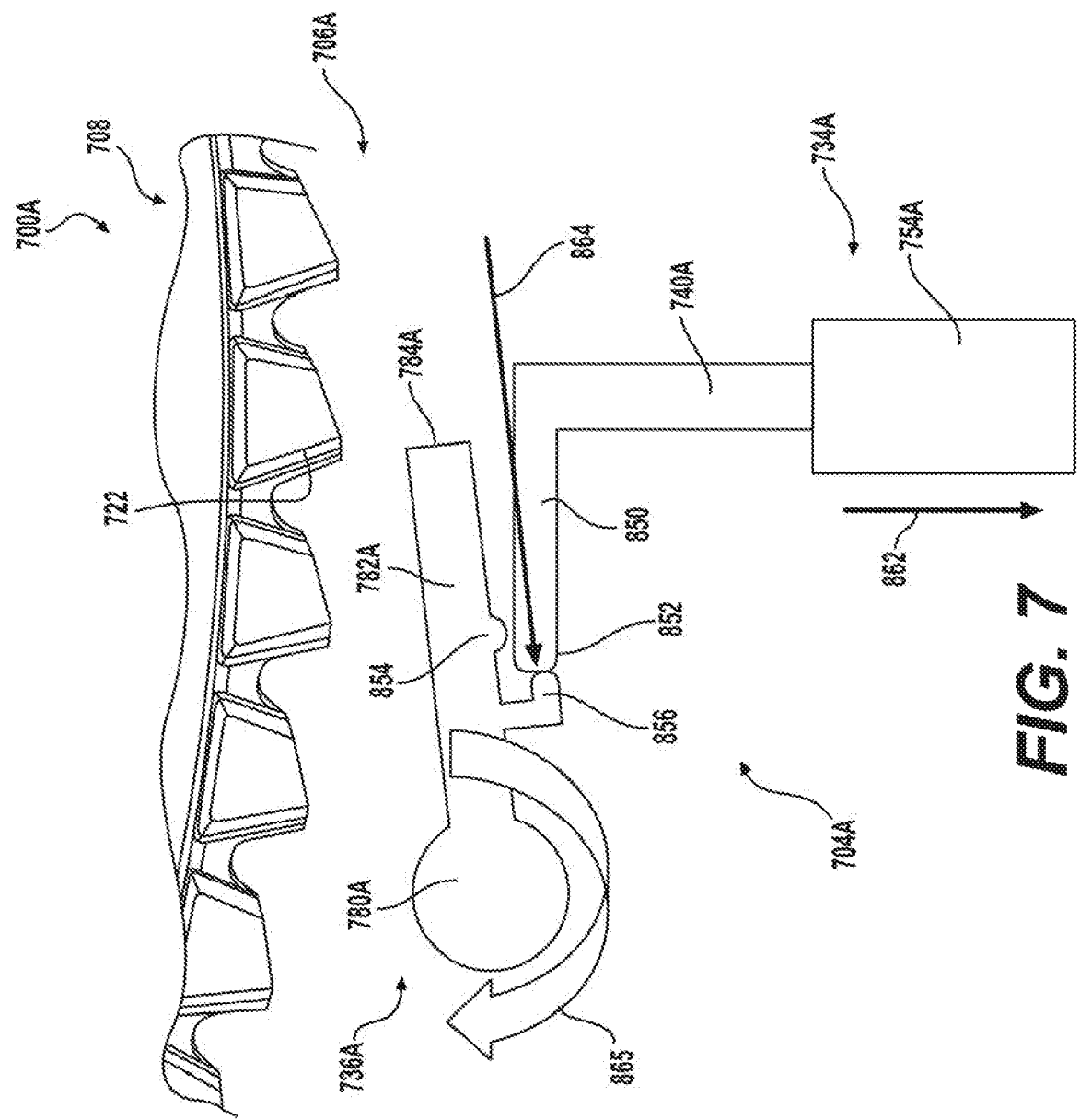
FIG. 7 illustrates this arrangement with the strut now located into its released/non-deployed position.

Referring now to FIGS. 6 and 7, an alternative embodiment of an actuator module 704A is disclosed for use with a clutch module 702 within a controllable one-way clutch assembly 700A. This arrangement is configured to employ a linearly moveable actuator output member 740A to move active strut 736A between its deployed (FIG. 6) and non-deployed (FIG. 7) positions. As seen, electromagnetic actuator 734A includes coil assembly 754A and moveable actuator component or plunger 740A which has an actuation flange 850 with an end segment 852 engaging a pair of pivot lugs 854, 856 formed on strut segment 782A of active strut 736A. Arrow 858 indicates movement of moveable plunger 740A to an extended position in response to energization of coil assembly 754A. This action results in an actuation force, indicated by arrow 860, acting on deployment pivot lug 854 for causing active strut 736A to pivot about pivot post segment 780A to its deployed position with its end segment 784A engaged with one of ratchet teeth 722 on inner race 708.

In contrast, FIG. 7 illustrates operation of actuator module 704A when coil assembly 754A is de-energized. This de-energization causes a return spring, not shown but indicated by arrow 862, to move moveable plunger 740A to a retracted position. As a result of retraction of plunger 740A, end segment 852 of actuation flange 850 engages return pivot lug 856 on active strut 736A. This action results in a return force, as indicated by arrow 864, acting on strut 736A and causing strut 736A to pivot about its pivot post segment 780A to its released position. In addition, end segment 852 continues to engage return pivot lug 856 along the force line 864, which acts as a locking interface, so as to mechanically hold strut 736A in its released position and inhibit unintentional deployment of strut 736A when coil assembly 754A is non-energized. Arrow 865 illustrates a strut spring acting directly on an active strut 736A for biasing it toward its released position.

Figure 8:
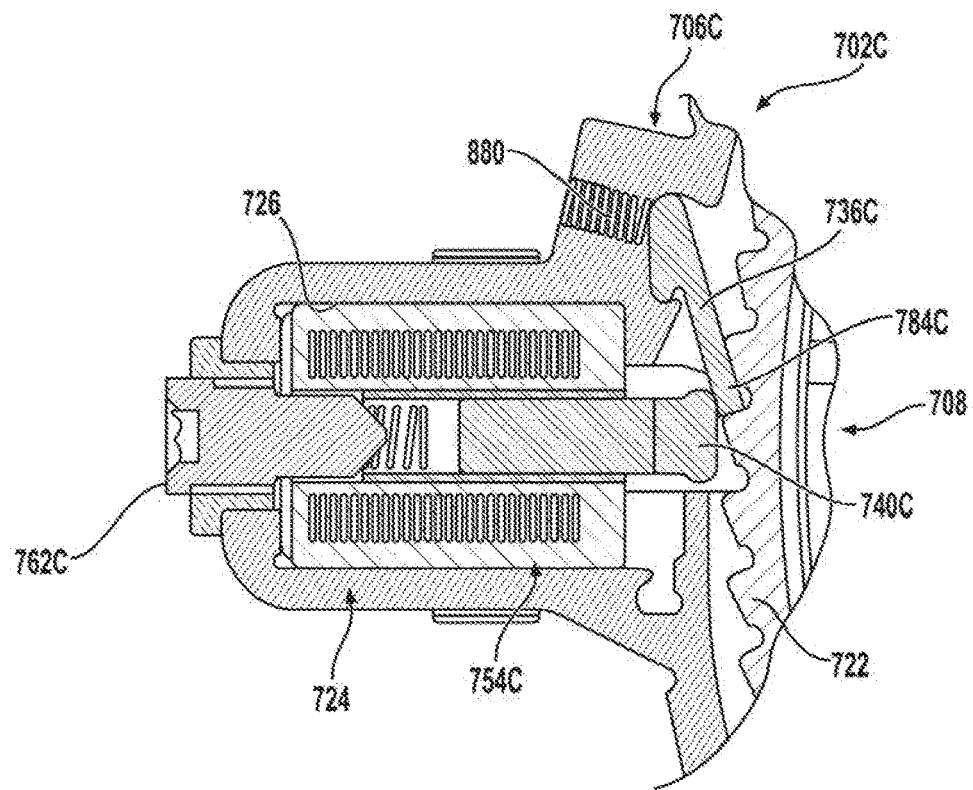
FIGS. 8 and 9 are side sectional views of yet another configuration for an actuator module for a one-way clutch utilizing a moveable magnetic pole piece to engage and move the strut from its released/non-deployed position to its locked/deployed position in response to energization of the coil assembly.
Figure 9:
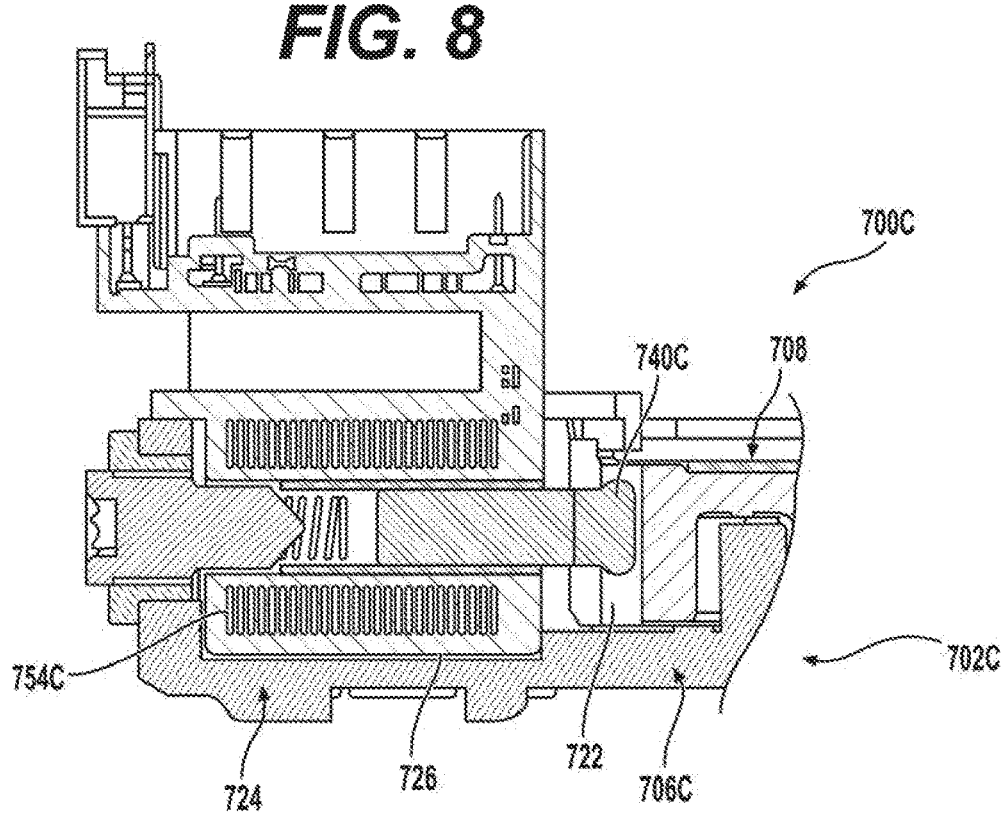

FIGS. 8 and 9 illustrate another alternative embodiment of an actuator module 704C configured for use in cooperation with clutch module 702C within a one-way clutch assembly 700C. In this arrangement a "direct-action" relationship is established between a moveable magnetic pole member or plunger 740C and an active strut 736C. Both illustrations show moveable plunger 740C moved to an extend position relative to a stationary pole piece 762C in response to energization of a coil assembly 754C. This movement of plunger 740C acts to forcibly pivot active strut 736C to its locked position (shown), in opposition to the biasing of a strut return spring 880, until its end section 784C is engaged with one of ratchet teeth 722 on inner race 708. The magnetic field generated upon energization of coil assembly 754C is amplified by a shortened version of stationary pole piece 762C which results in an increased engagement force acting on strut 736C when engaged with ratchet teeth 722. Strut 736C returns to its released position once coil assembly 754C is deactivated due to the biasing force applied thereto via strut spring 880.

Figure 10:
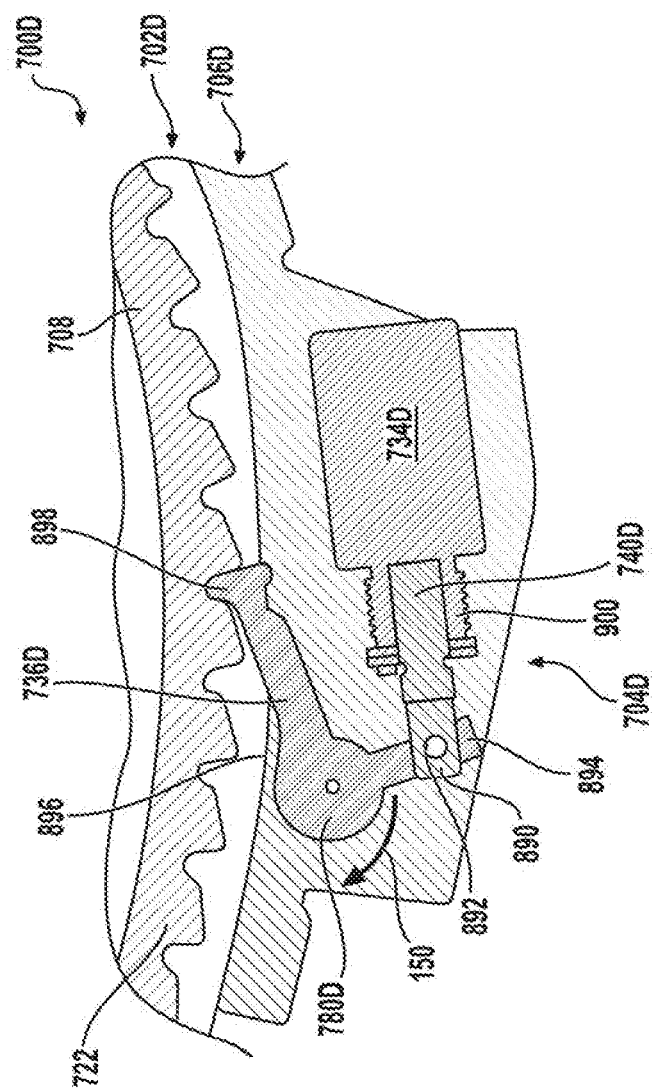
FIG. 10 illustrates a solenoid-type actuator associated with the actuator module for use in the controllable one-way clutch assemblies of the present disclosure.

Referring now to FIG. 10, yet another alternative embodiment is shown for an actuator module 704D configured for use with clutch module 702D within a controllable one-way clutch 700D. This arrangement aims to provide improved strut motion and actuation forces by implementing a simpler strut geometry that only pivots about a load bearing area. Strut actuation is provided by a pull-type solenoid actuator 734D having a linear plunger 740D with sufficient travel to ensure that the strut 736D pivots fully between its released/non-deployed and locked/deployed positions. The biasing spring within the solenoid actuator 734D functions to return the strut 736D to its released position following deactivation of the solenoid actuator 734D. The arrangement also employs strut 736D having a modified locking tip profile adapted to interact with ratchet teeth on the inner race. The modified locking tip profile acts to reject the strut out of engagement if the strut 736D is not positioned deep enough in the tooth valley. The depth of strut position in the tooth valley is dependent on relative speed between the strut 736D and the inner race and the spring force.

FIG. 10 illustrates actuator module 704D to include solenoid actuator 734D with an axially-moveable actuation component or plunger 740D. Terminal end 890 of plunger 740D is fixed via an articulating joint coupling 892 to a first leg 894 of active strut 736D which extends outwardly from a pivot post segment 780D that is pivotably supported by outer race 706D. A second leg 896 of strut 736D defines a revised tip end 898. A spring 900 acts between the solenoid housing and plunger 740D. Actuation of solenoid 734D acts to retract (pull-in) plunger 740D, in opposition to spring 900, for pivoting strut 736D to its locked position shown. Arrow 781 schematically indicates a strut return spring which is discussed hereinafter in greater detail to provide an anti-tipping feature for strut 736D.

Figure 11:
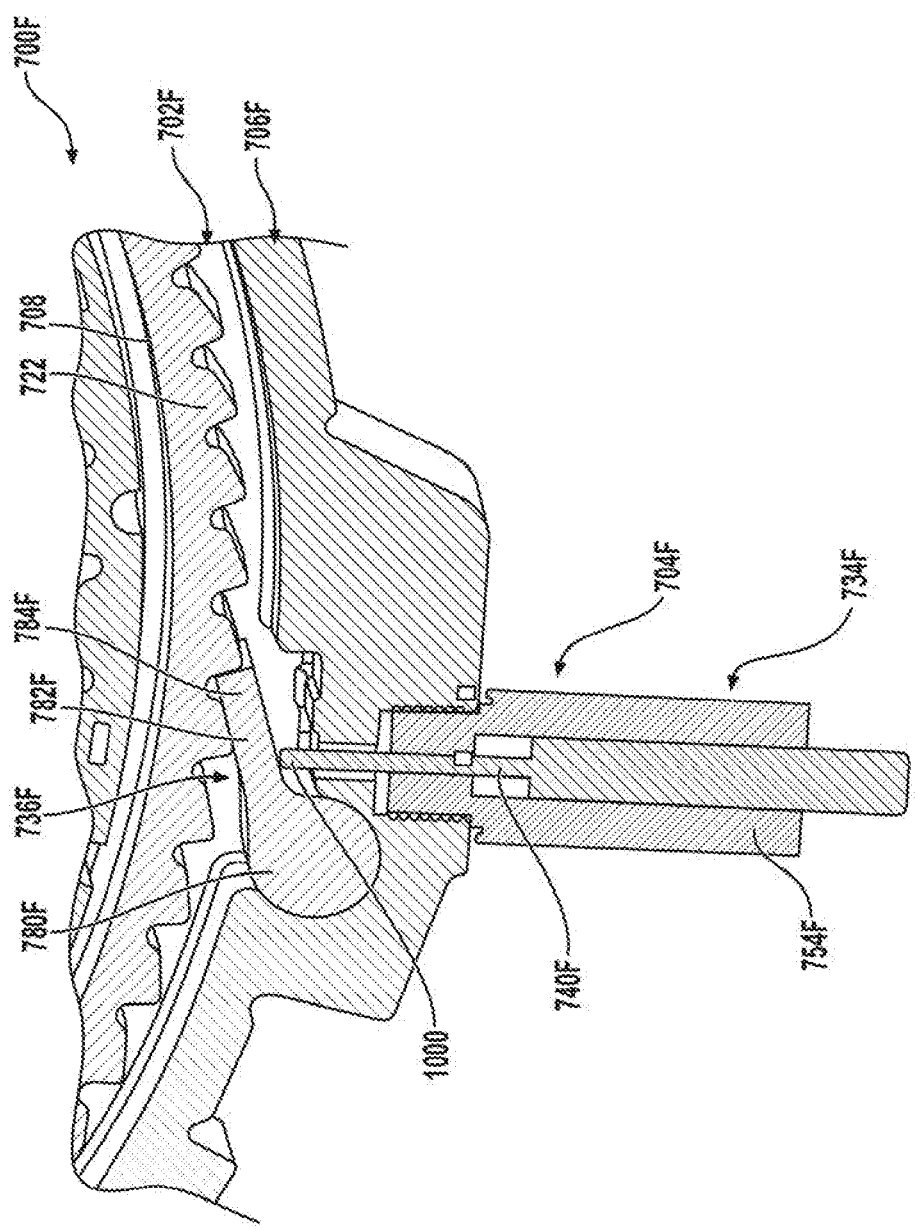
FIGS. 11-13 illustrate another version of an actuator module for use in the controllable one-way clutch assemblies of the present disclosure.
Figure 12:
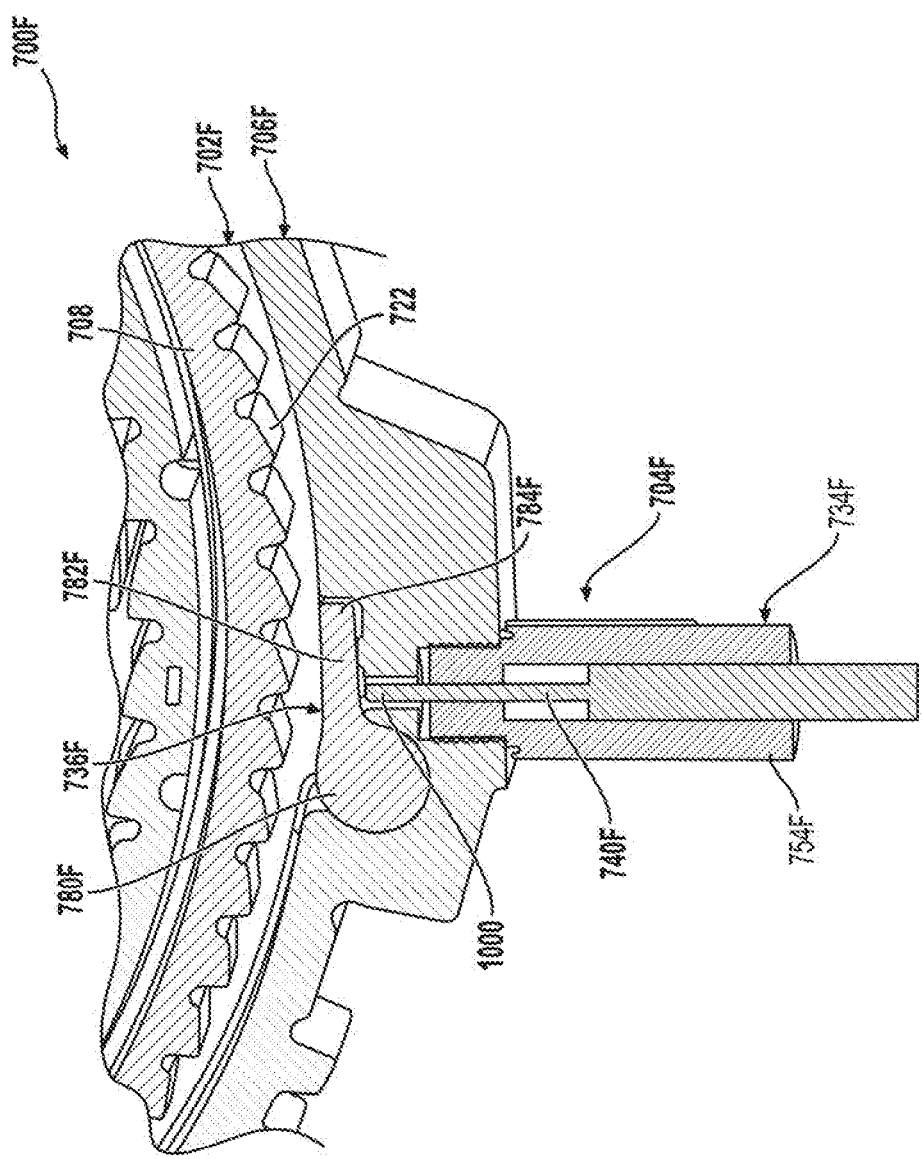
Figure 13:
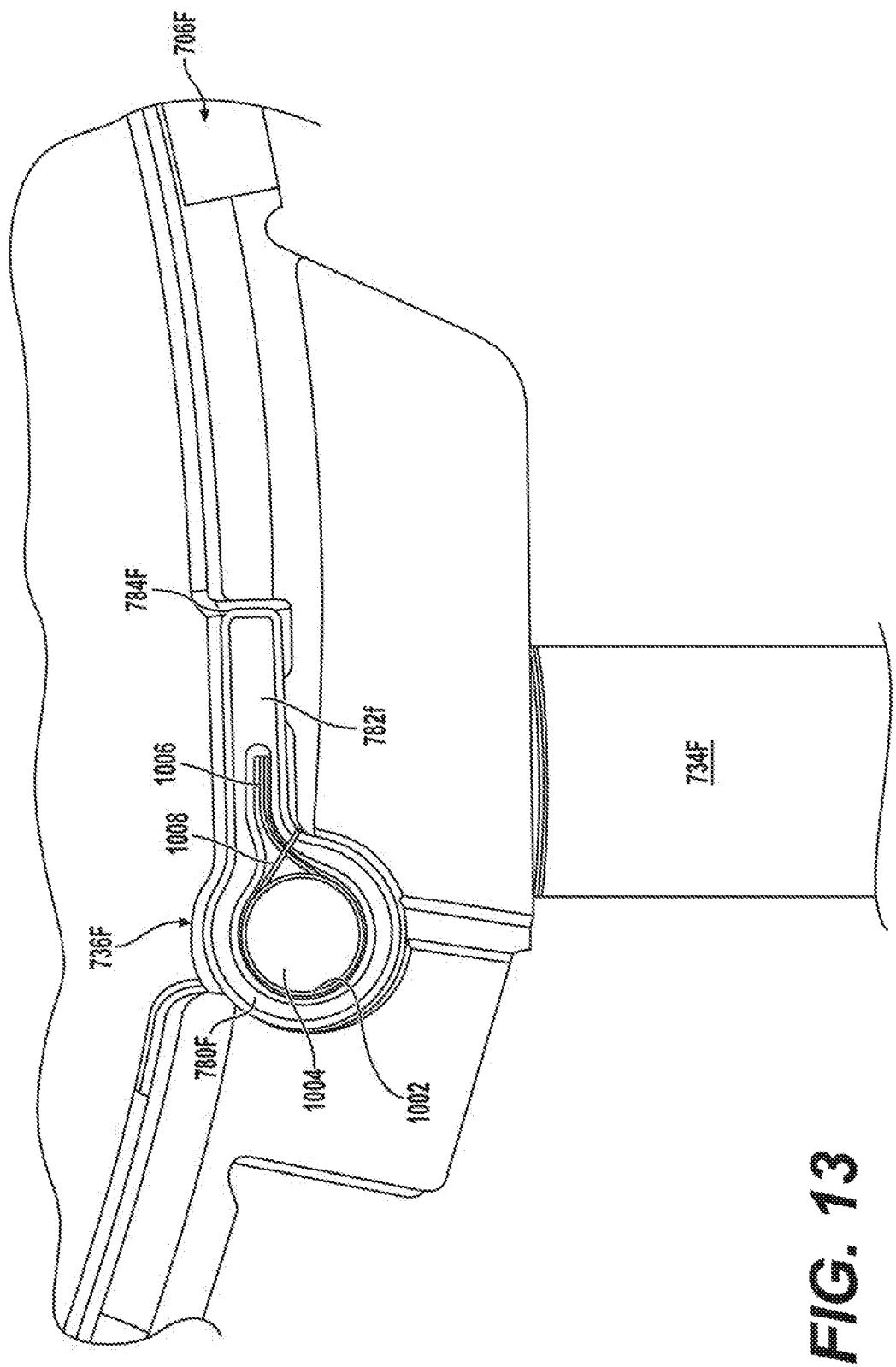

Referring now to FIGS. 11-13, yet another alternative embodiment is shown for an actuator module 704F configured for use with clutch module 702F within a controllable one-way clutch 700F. This arrangement may be useful when a pull-type solenoid (e.g., pull-type solenoid actuator 734D shown in FIG. 10) cannot be packaged. This arrangement employs an electromagnetic actuator 734F including coil assembly 754F with a linearly-moveable plunger 740F (i.e., push solenoid) extending radially outwardly from the inner race 708 and outer race 706F of clutch module 702F to move active strut 736F between its deployed (FIG. 11) and non-deployed (FIG. 12) positions in response to energization of coil assembly 754F. As seen, linearly-moveable plunger 740F has an end segment 1000 for engaging strut segment 782F of active strut 736F. Movement of linearly-moveable plunger 740F to an extended position (FIG. 11) results in an actuation force being exerted on an underside strut segment 782F for causing active strut 736F to pivot about pivot post segment 780F to its deployed position with its end segment 784F engaged with one of ratchet teeth 722 on inner race 708.

FIG. 12 illustrates operation of actuator module 704F when coil assembly 754F is de-energized. This de-energization allows active strut 736F to pivot about pivot post segment 780F to its non-deployed position with its end segment 784F disengaged with ratchet teeth 722 on inner race 708.

As best shown in FIG. 13, active strut 736F defines a spring pocket 1002 with a circular portion 1004 disposed in pivot post segment 780F and a tang retention portion 1006 extending therefrom into the strut segment 782F. A torsion-type spring 1008 that has a pair of tangs is disposed within the spring pocket 1002, with one tang extending into the tang retention portion 1006 of spring pocket 1002 and the other tang wound in a slot (not shown) on the outer race 706F. The angle between the slot in the outer race 706F and the tang retention portion 1006 ensures a preload, which can be tuned according to different inputs. This way, the linearly-moveable plunger 740F (FIGS. 11 and 12) and the active strut 736F only need to make contact in the engagement direction (i.e., to move active strut 736F to its deployed position). The active strut 736F returns to its tucked-in or non-deployed position under its spring action of torsion-type spring 1008. The linearly-moveable plunger 740F returns to its power-off or disengaged position under the force of its own internal spring (not shown).

Figure 14:
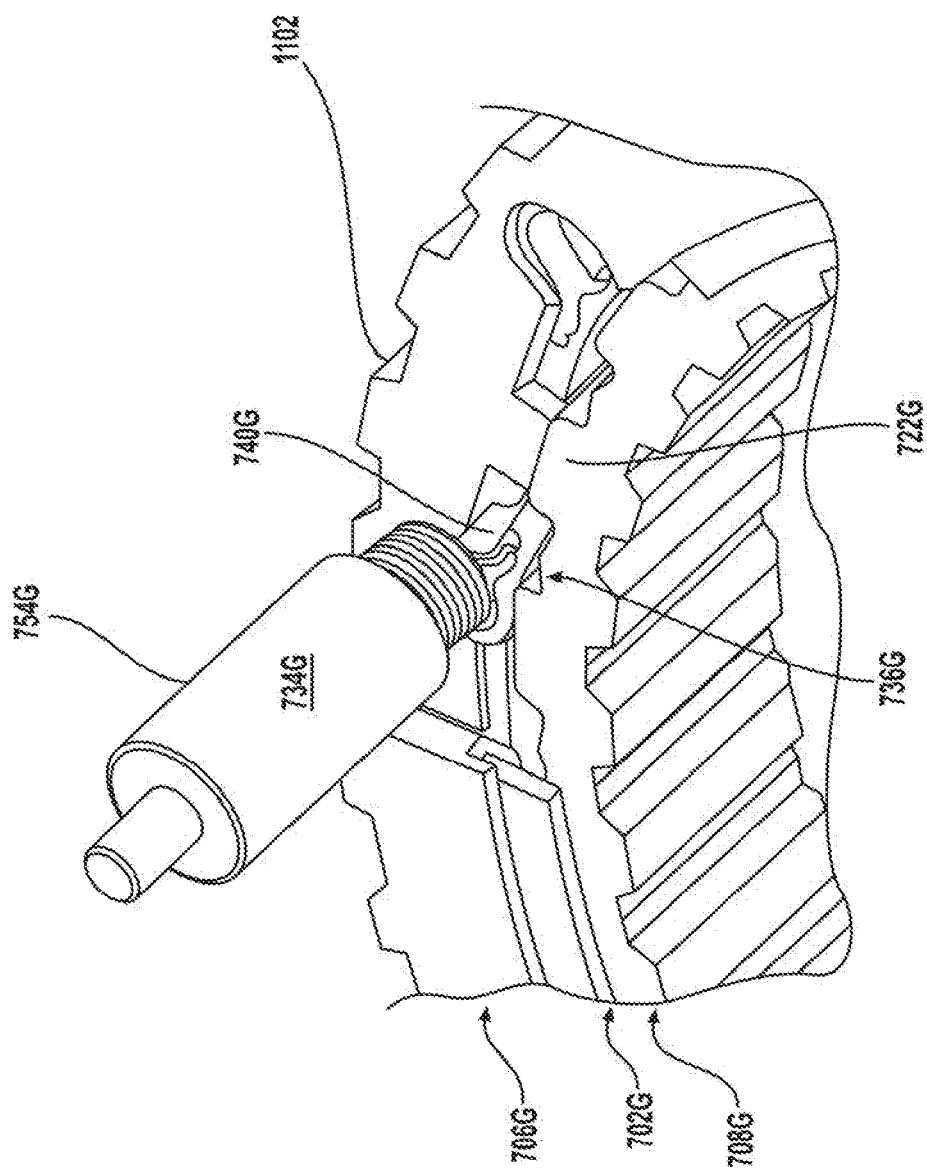
FIGS. 14 and 15 illustrate another version of an actuator module for use in the controllable one-way clutch assemblies of the present disclosure.
Figure 15:
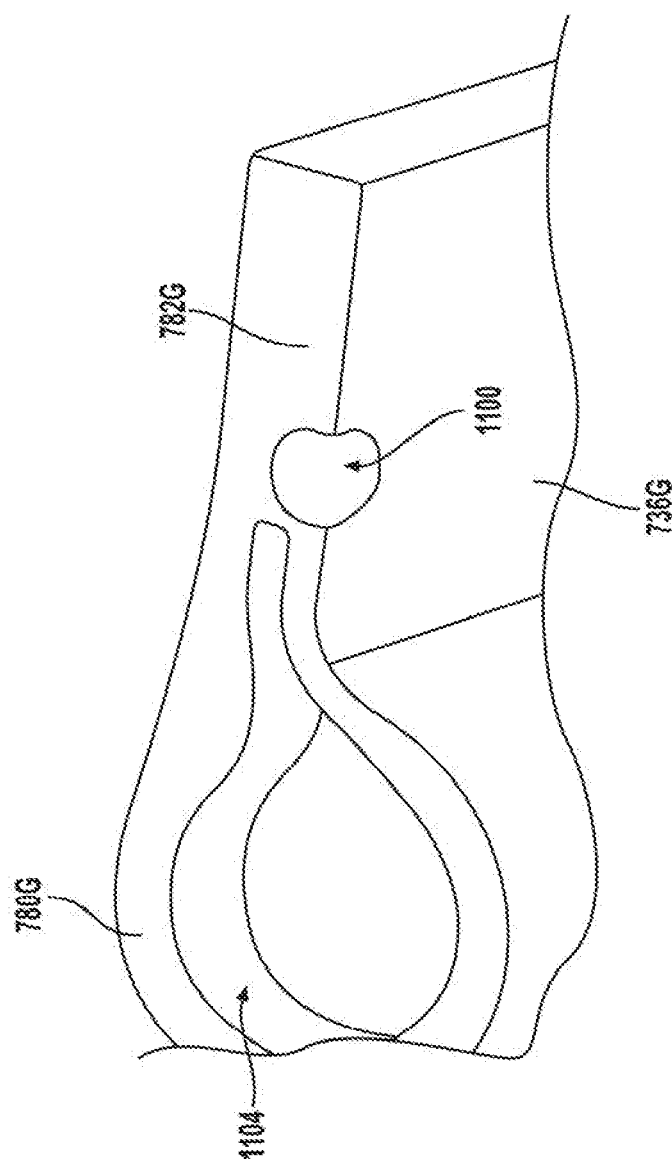

Referring to FIGS. 14 and 15, another alternative version of an actuator module 704G is shown and which is configured for use with a clutch module 702G within a controllable clutch 700G. In this version, an electromagnetic actuator 734G includes a coil assembly 754G with a linearly-moveable plunger 740G extending axially from outer race 706G of clutch module 702G to move an active strut 736G between its deployed (FIG. 14) and non-deployed (not shown) positions in response to energization of coil assembly 754G. Active strut 736G defines a plunger ramp 1100 (FIG. 15) on a side surface of strut segment 782G. Linearly-moveable plunger 740G has an end segment 1102 for engaging plunger ramp 1100 of strut segment 782G. Movement of linearly-moveable plunger 740G from a retracted position to an extended position results in an actuation force being exerted on plunger ramp 1100 of strut segment 782G for causing active strut 736G to pivot about pivot post segment 780G from its non-deployed position to its deployed position with its end segment 784G engaged with one of ratchet teeth 722G on inner race 708G. Because plunger ramp 1100 of strut segment 782G is sloped or angled (i.e., includes a suitable inclined plane feature), linear movement of plunger 740G to its extended position causes end segment 1102 to engage plunger ramp 1100 and displace active strut 736G about pivot post segment 780G. Linearly-moveable plunger 740G is positioned strategically relative to a hard stop, non-deployed position of the active strut 736G. As a result of plunger ramp 1100, the linearly-moveable plunger 740G wedges itself between the housing (i.e., outer race 706G) and active strut 736G to rotate active strut 736G out of its non-deployed position and into its deployed position. As the linearly-moveable plunger 740G is retracted (when coil assembly 754G is de-energized), a torsion-type spring (e.g., torsion-type spring 1008 shown in FIG. 13) disposed in spring pocket 1104 of active strut 736G drives active strut 736G back to its non-deployed position.

All of the various controllable one-way clutches described previously includes an active strut pivotably supported in a housing or clutch member for movement between a retracted (i.e. non-deployed) position and an extended (i.e. deployed) position relative to ratchet teeth formed on another clutch member of the clutch module. In each instance, the active strut was biased by a strut spring toward its non-deployed position and an engagement interface was established between an engagement surface on the strut and a linearly-moveable actuation component of the an electromagnetic actuator. The following detailed description is directed to advancements and improvements made to the interface between the strut engagement surface and the moveable actuation component of the electromagnetic actuator.

Figure 16:
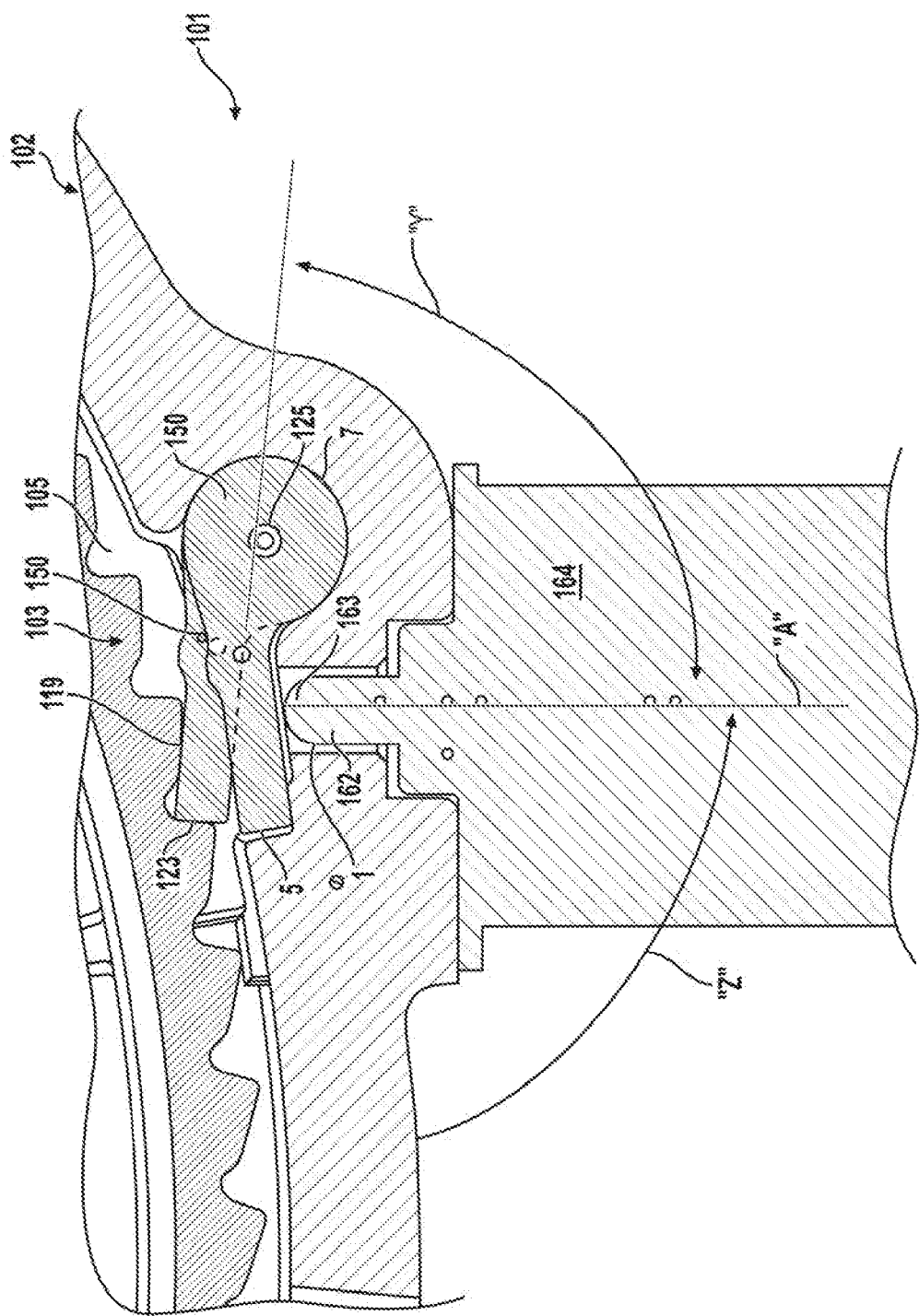
FIG. 16 is a partial sectional view of a controllable one-way clutch having a clutch module and an actuator module with a strut/plunger engagement interface configuration embodying the inventive concepts of the present disclosure.

Referring now to FIG. 16, an alternative strut/actuator interface configuration for the actuation/release engagement between active strut 130 and a linearly-moveable actuation component (i.e., plunger) 162 of an electromagnetic actuator 164 and a portion of a controllable one-way clutch 101 that includes a first clutch member 102 of a clutch module (or the housing of an actuator module fixed to the first clutch member 102) will now be described. In addition to first clutch member 102, the clutch module is shown to include a second clutch member or inner race 103 having ratchet teeth 105. Strut spring 150 may be disposed to engage active strut 130 and return active strut 130 to a non-deployed position. Strut spring 150 may be disposed at least partially within (or hidden by) active strut 150. Plunger 162 is shown retracted when active strut 130 is located in its non-deployed position with its latch edge 123 disengaged from ratchet tooth 105. Plunger 162 is also shown (in phantom) extended when active strut 130 is located in its deployed position with its latch edge 123 engaged with one of ratchet teeth 105. The interaction between tip 163 of plunger 162 and engagement surface 121 of active strut 130 is configured to reduce sliding movement therebetween. In particular, engagement section 115 of strut 130 includes an inner face surface 119, engagement surface 121, and a terminal end surface 123 configured to releaseably engage ratchet teeth (not shown) that are formed on the inner race (not shown) of the clutch module. Due to plunger tip 163 moving linearly as active strut 130 pivots through an arc, sliding movement can be minimized. Positioning plunger 162 relative to active strut 130 such that the angle between the axis "A" of plunger 162 and engagement surface 121 of active strut 130 is less than 90° (see angle "Z") when active strut 130 is tucked away in its non-deployed position. In addition, this angle between plunger axis "A" and engagement surface 121 of active strut 130 (see angle "Y") is also less than 90° when active strut 130 is in its deployed position. In other words, a 90° angle between plunger 162 and engagement surface 121 on active strut 130 occurs in an intermediate position within the range of pivotal strut travel. As such, the relative friction between plunger tip 163 and engagement surface 121 on active strut 130 is minimized.

Figure 17:
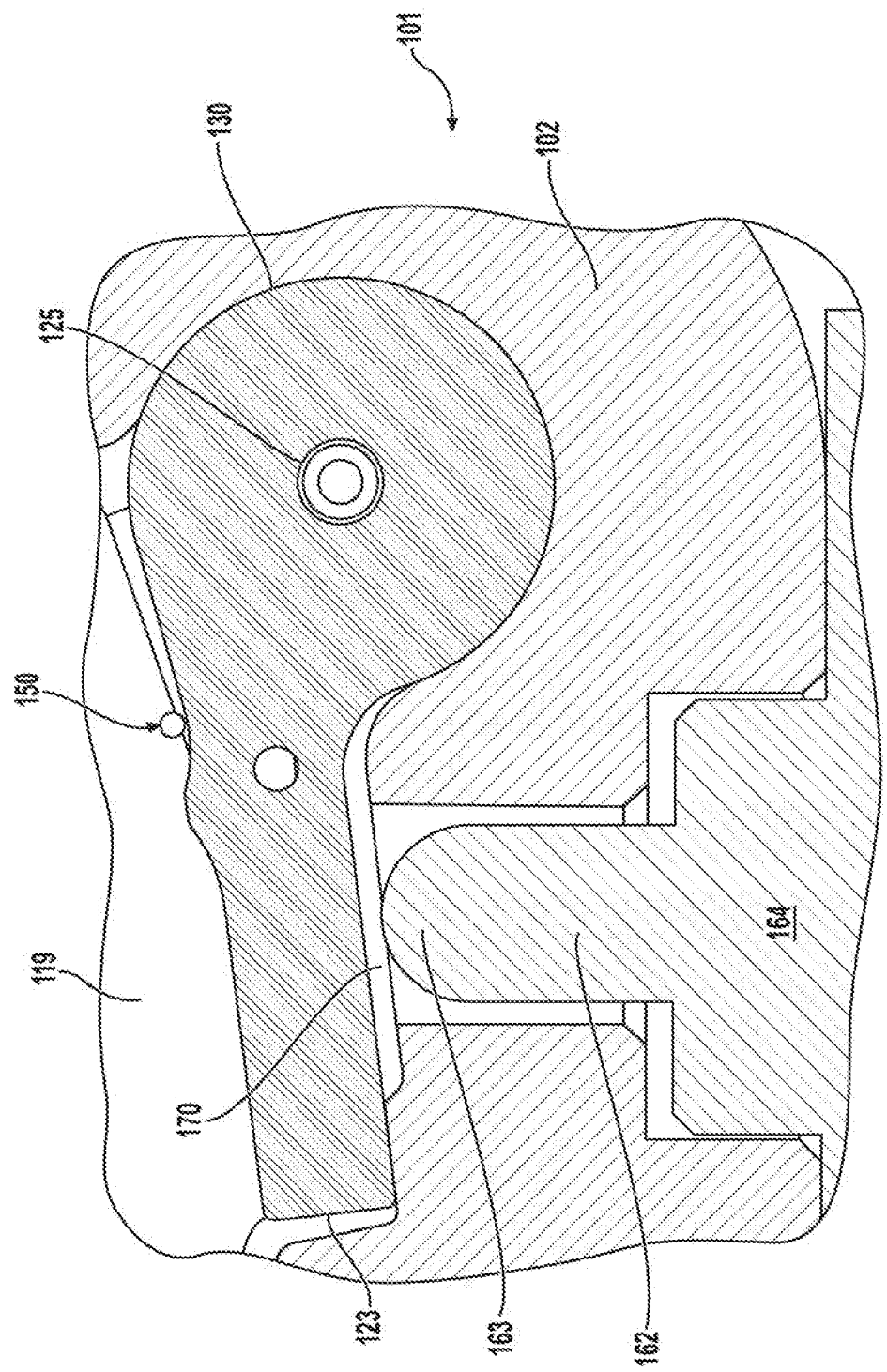
FIG. 17 is an enlarged partial sectional view of a controllable one-way clutch having an alternative strut/plunger engagement interface configuration embodying the inventive concepts of the present disclosure.

FIG. 17 is generally an enlarged partial view of FIG. 16, but is provided to better illustrate yet another alternative strut/actuator interface configuration between plunger tip 163 and engagement surface 121 when active strut 130 is located in its non-deployed position via strut spring 150 and plunger 162 is fully retracted when actuator 164 is powered off (the internal return spring acting on plunger 162 forces plunger 162 to its fully retracted position). Specifically, a clearance or "gap" 170 is established between engagement surface 121 and plunger tip 163. Gap 170 ensures that solenoid actuator 164 is able to initiate movement of plunger 162 from its fully retracted position, when the dimension of gap 170 is largest, and therefore when the actuation force is lowest due to conventional solenoid design. Thus, the only force required to be overcome is the plunger return force exerted on the plunger via the internal solenoid plunger return spring, and not the biasing force of strut spring 150. As seen, as solenoid actuator 164 initiates movement of plunger 162, gap 170 decreases rapidly as the actuation force increases exponentially. Only then does plunger tip 163 engage engagement surface 121 when it is more than able to overcome the additional resistance exerted by strut spring 150. Note that this clearance gap feature can be applicable to any types of struts and strut spring designs. Gap 170 also makes assembly of solenoid actuator 164 to clutch member/housing 102 easier, allowing part dimensions and tolerances to be less restrictive, since there is no need to have plunger tip 163 in constant contact with strut surface 121 of active strut 130.

Figure 18:
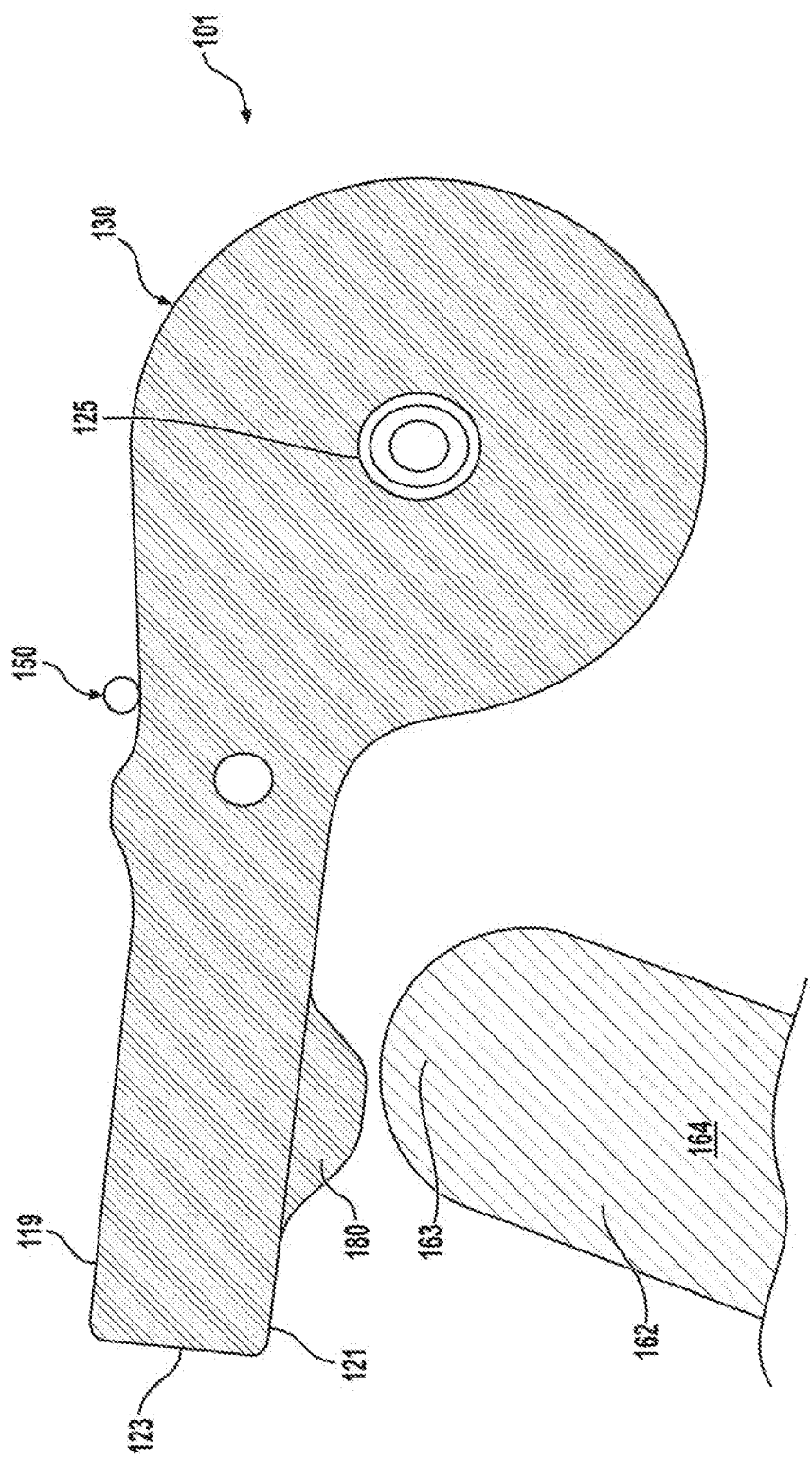
FIGS. 18 and 19 illustrate still further alternative strut/plunger engagement interface configurations embodying the inventive concepts of the present disclosure.
Figure 19:
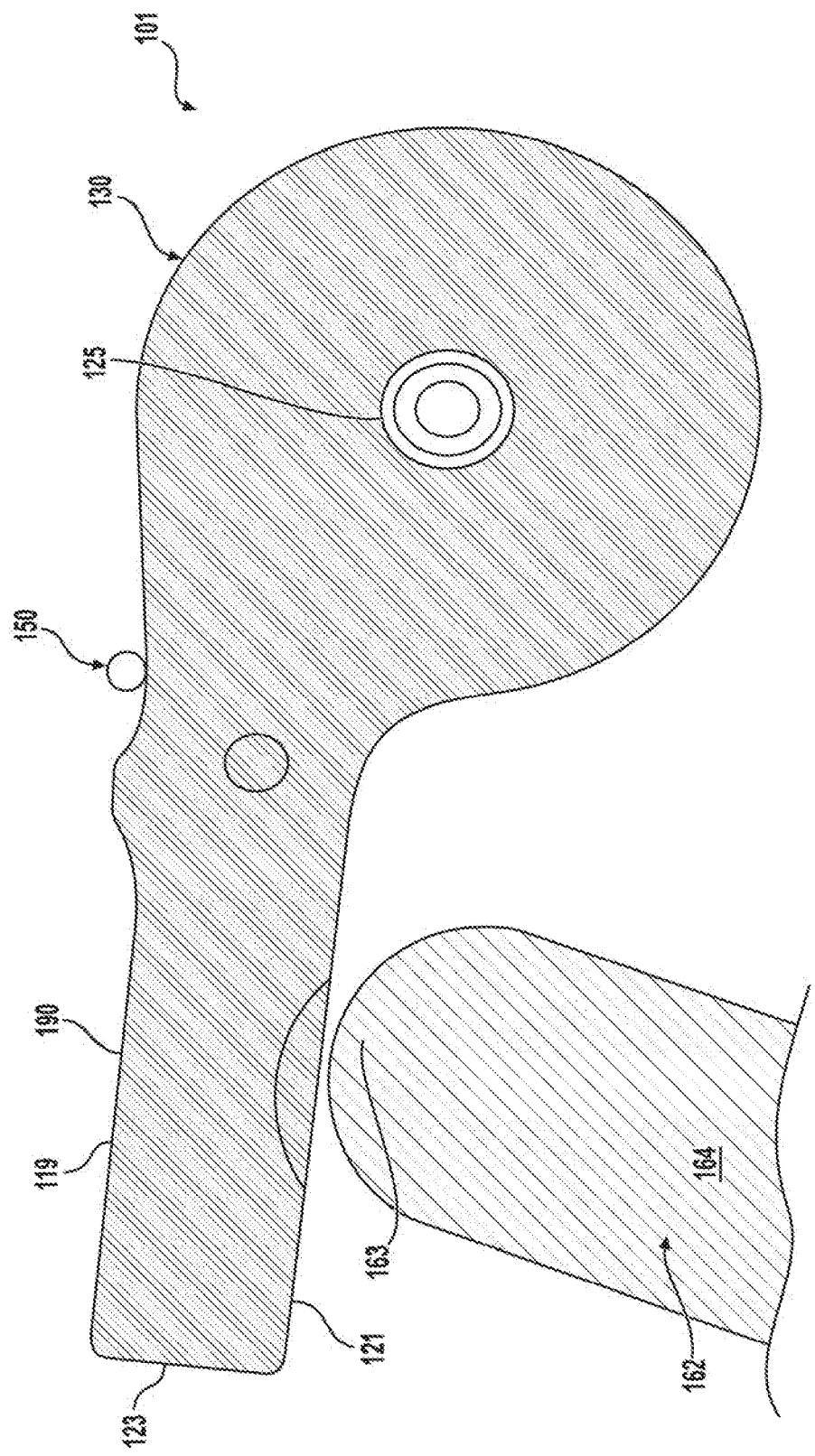

FIGS. 18 and 19 illustrate still further alternatives for the strut/actuator interface configuration capable of controlling or variably altering movement of active strut 130 using solenoid plunger 162 by incorporating a camming arrangement (feature) in association with engagement surface 121. Specifically, FIG. 18 illustrates a convex camming feature 180 formed on engagement surface 121 while FIG. 19 illustrates a concave camming feature 190 formed in engagement surface 121. The convex camming feature 180 would result in decelerating the strut engagement after initial contact by plunger 162 followed by an accelerating engagement rate as plunger 162 moves toward the side of the convex feature 180. In contrast, the concave camming feature 190 would result in accelerating the strut engagement after initial contact by plunger 162 followed by a slowing engagement rate as plunger 162 moves toward the side of concave feature 190. Varying the characteristics and dimensions of these camming features (180, 190) via location relative to plunger 162, depth, height, slope, etc., can be used to tune strut engagement and disengagement behavior.

The convex feature 180 or the concave feature 190 may be disposed at various positions on the engagement surface 121 relative to the axis "A" of plunger 162. For example and without limitation, the convex feature 180 or the concave feature 190 may be disposed offset from the axis "A" such as proximate or distal to inner race 103. By positioning either convex feature 180 or concave feature 190 offset from axis "A", the movement of the engagement surface 121 (and active strut 130) may be adjusted or "tuned". Additionally and alternatively, it is understood that the engagement surface 121 may include additional features that are not concave or convex, and that the embodiments shown are merely exemplary. For example, the convex feature 180 or concave feature 190 may be configured as a ramp, a series of steps, or any other geometric shape to engage the plunger 162.

The plunger 162 may be disposed at an angle relative to axis "A" and that is shown in FIGS. 16-19. For example and without limitation, plunger 162 (and solenoid actuator 164) may be disposed at an angle relative to axis "A" that coincides with the axis "A" as shown in FIGS. 1 and 1A (i.e., the rotation center of the clutch assembly 20). Additionally and alternatively, plunger 162 may be disposed at an angle different than either axis "A" as shown in FIGS. 1 and 1A and 16-19.

The plunger tip 163 may also be configured in other geometric shapes apart from the exemplary half-circle (i.e., hemisphere) as shown two-dimensionally in FIGS. 16-19. For example and without limitation, plunger tip 163 may be configured with a flat surface to engage engagement surface 121. Additionally and alternatively, plunger tip 163 may be configured with a concave surface to engage, for example, concave feature 190 or plunger tip 163 may be configured with a convex surface to engage concave feature 180. Plunger tip 163 may be configured with a pointed tip to engage a recess in engagement surface 121.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A one-way clutch assembly comprising:
   a clutch module having a first clutch component and a second clutch component arranged to rotate relative to the first clutch component and having ratchet teeth; and
   an actuator module having a direct strut actuation configuration provided between a linearly-moveable actuation component of a solenoid-type actuator and a pivotably moveable strut, the actuator module is mounted to the first clutch component of the clutch module with the solenoid-type actuator having an energizeable coil assembly and the linearly-moveable actuation component, the strut is pivotally moveable between a non-deployed position and a deployed position relative to the ratchet teeth formed on the second clutch component of the clutch module in response to translation of the actuation component between a retracted position and an extended position, and a strut biasing arrangement biasing the strut toward its non-deployed position,
   wherein the direct strut actuation configuration includes a strut/actuator engagement interface configured to minimize sliding movement between a tip of the linearly-moveable actuation component associated with the solenoid-type actuator and an engagement surface on the pivotal strut, and
   wherein the strut/actuator engagement interface includes a predetermined separation between the tip of the linearly-moveable actuation component associated with the solenoid-type actuator and the engagement surface of the pivotable strut when the strut is located by the strut biasing arrangement in its non-deployed position.

2. The one-way clutch assembly of claim 1, wherein the solenoid-type actuator of the actuator module includes an internal return spring configured to bias the linearly-moveable actuation component toward its retracted position, and wherein the moveable actuation component is a plunger configured to act on the engagement surface of the strut.

3. The one-way clutch assembly of claim 2, wherein the tip of the plunger is displaced a first distance from the engagement surface on the strut when the plunger is located in its retracted position and the strut is located in its non-deployed position.

4. The one-way clutch assembly of claim 3, wherein an initial movement of the plunger from its retracted position toward an intermediate position causes the tip of the plunger to engage the engagement surface of the strut and drive the strut from its non-deployed position into its deployed position in opposition to the biasing exerted on the strut by the strut biasing arrangement.

5. The one-way clutch assembly of claim 4, wherein continued movement of the plunger from its intermediate position toward its extended position causes the tip of the plunger to disengage the engagement surface of the strut in its deployed position such that the tip of the plunger is displaced a second distance from the engagement surface of the strut, and wherein the second distance is greater than the first distance.

6. The one-way clutch assembly of claim 5, wherein location of the plunger in its retracted position defines a plunger tip position of an angle of less than ninety degrees relative to the engagement surface of the strut, wherein location of the plunger in its intermediate position causes the tip of the plunger to engage the engagement surface of the strut at an angle of ninety degrees relative to the engagement surface of the strut, and wherein location of the plunger in its extended position defines a plunger tip position of an angle greater than ninety degrees relative to the engagement surface of the strut.

7. The one-way clutch assembly of claim 4, wherein continued movement of the plunger from the intermediate position to its extended position causes the plunger tip to disengage the engagement surface of the strut, and wherein the tip of the plunger is displaced a second distance from the engagement surface of the strut.

8. The one-way clutch assembly of claim 7, wherein the retracted position defines a plunger tip position with an angle of less than ninety degrees relative to the engagement surface of the strut, wherein at the intermediate position the plunger tip engages the engagement surface of the strut at an angle of ninety degrees relative to the engagement surface of the strut, and wherein the extended position defines a plunger tip position with an angle greater than ninety degrees relative to the engagement surface of the strut.

9. A one-way clutch assembly comprising:
a clutch module having a first clutch component and a second clutch component arranged to rotate relative to the first clutch component and having ratchet teeth; and
an actuator module having a direct strut actuation configuration provided between a moveable actuation component of a power-operated actuator and a pivotably moveable strut, the actuator module mounted to the first clutch component of the clutch module and including the power-operated actuator having an energizeable coil assembly and the linearly-moveable actuation component, the strut is pivotally moveable between a non-deployed position and a deployed position relative to the ratchet teeth formed on the second clutch component of the clutch module in response to translation of the actuation component between a retracted position and an extended position, and a strut biasing arrangement biasing the strut toward its non-deployed position,
wherein the direct strut actuation configuration includes a strut/actuator engagement interface with an engagement cam formed on the engagement surface of the strut and which is engageable with a tip portion of the actuation component to vary the behavior of the pivotal movement of the strut between its non-deployed and deployed positions.

10. The one-way clutch assembly of claim 9, wherein the strut/actuator engagement interface includes a predetermined separation between the tip portion of the linearly-moveable actuation component associated with the power-operated actuator and the engagement surface of the strut when the strut is located by the strut biasing arrangement in its non-deployed position to provide the strut/actuator engagement interface configuration.

11. The one-way clutch assembly of claim 9, wherein the power-actuator of the actuator module is a solenoid actuator having an internal return spring, and wherein the actuation component is a linearly-moveable plunger configured to act on an engagement surface of the strut.

12. The one-way clutch assembly of claim 11, wherein the tip portion of the plunger is displaced a first distance from the engagement surface on the strut when the plunger is located in its retracted position and the strut is located in its non-deployed position.

13. The one-way clutch assembly of claim 12, wherein an initial movement of the plunger from its retracted position into an intermediate position causes the tip portion of the plunger to engage the engagement surface of the strut and drive the strut from its non-deployed position into its deployed position in opposition to the biasing exerted on the strut by the strut biasing arrangement.

14. The one-way clutch assembly of claim 13, wherein continued movement of the plunger from its intermediate position toward its extended position causes the tip portion of the plunger to disengage the engagement surface of the strut in its deployed position such that the tip portion of the plunger is displaced a second distance from the engagement surface of the strut.

15. The one-way clutch assembly of claim 14, wherein the second distance is greater than the first distance.

16. The one-way clutch assembly of claim 14, wherein location of the plunger in its retracted position defines a plunger tip position having an angle of less than ninety degrees relative to the engagement surface of the strut, wherein location of the plunger in its intermediate position causes the tip portion of the plunger to engage the engagement surface of the strut at an angle of ninety degrees relative to the engagement surface of the strut, and wherein location of the plunger in its extended position defines a plunger tip position having an angle greater than ninety degrees relative to the engagement surface of the strut.

17. The one-way clutch assembly of claim 13, wherein a second movement of the plunger from the intermediate position to its extended position causes the plunger tip portion to disengage the engagement surface of the strut, wherein the tip portion of the plunger is displaced a second distance from the engagement surface of the strut, and wherein the second distance is greater than the first distance.

18. A one-way clutch assembly comprising:
- a clutch module having a first clutch component and a second clutch component arranged to rotate relative to the first clutch component and having ratchet teeth; and
- an actuator module having a direct strut actuation configuration provided between a linearly-moveable actuation component of a solenoid-type actuator and a pivotably moveable strut, the actuator module mounted to the first clutch component of the clutch module with the solenoid-type actuator having an energizeable coil assembly and the linearly-moveable actuation component, the strut is pivotally moveable between a non-deployed position and a deployed position relative to the ratchet teeth formed on the second clutch component of the clutch module in response to translation of the actuation component between a retracted position and an extended position, and a strut biasing arrangement biasing the strut toward its non-deployed position,
- wherein the direct strut actuation configuration includes a strut/actuator engagement interface configured to minimize sliding movement between a tip of the linearly-moveable actuation component associated with the solenoid-type actuator and an engagement surface on the pivotal strut, and
- wherein the linearly moveable actuation component is arranged at a 90 degree angle relative to the engagement surface at an intermediate position of the strut between the deployed and the non-deployed position.

* * * * *